(12) United States Patent
Krebs et al.

(10) Patent No.: US 7,029,280 B2
(45) Date of Patent: Apr. 18, 2006

(54) E-LEARNING COURSE EDITOR

(75) Inventors: Andreas S. Krebs, Karlsruhe (DE);
Michael Altenhofen, Karlsruhe (DE);
Joachim Schaper, Landau/Pfalz (DE);
Wolfgang Gerteis, Karlsruhe (DE);
Torsten Leidig, Karlsruhe (DE)

(73) Assignee: SAP AG, Walldorf (DE)

( * ) Notice: Subject to any disclaimer, the term of this patent is extended or adjusted under 35 U.S.C. 154(b) by 51 days.

(21) Appl. No.: 10/184,112

(22) Filed: Jun. 28, 2002

(65) Prior Publication Data

US 2003/0151629 A1    Aug. 14, 2003

Related U.S. Application Data

(63) Continuation-in-part of application No. 10/134,676, filed on Apr. 30, 2002.

(60) Provisional application No. 60/354,945, filed on Feb. 11, 2002.

(51) Int. Cl.
*G09B 19/00* (2006.01)

(52) U.S. Cl. ...................... 434/118; 434/362

(58) Field of Classification Search ............. 434/118, 434/362
See application file for complete search history.

(56) References Cited

U.S. PATENT DOCUMENTS

| | | | |
|---|---|---|---|
| 5,008,853 A | | 4/1991 | Bly et al. |
| 5,310,349 A | * | 5/1994 | Daniels et al. ............. 434/350 |
| 5,395,243 A | | 3/1995 | Lubin et al. |
| 5,584,699 A | * | 12/1996 | Silver ........................ 434/201 |
| 5,675,802 A | | 10/1997 | Allen et al. |
| 5,692,125 A | | 11/1997 | Schloss et al. |
| 5,727,950 A | | 3/1998 | Cook |
| 5,788,508 A | * | 8/1998 | Lee et al. ................... 434/350 |
| 5,802,514 A | * | 9/1998 | Huber .......................... 707/4 |
| 5,881,315 A | | 3/1999 | Cohen |
| 6,011,949 A | | 1/2000 | Shimomukai |
| 6,014,134 A | * | 1/2000 | Bell et al. ................... 345/705 |
| 6,029,043 A | | 2/2000 | Ho et al. |
| 6,091,930 A | * | 7/2000 | Mortimer et al. ........... 434/362 |
| 6,099,320 A | * | 8/2000 | Papadopoulos ............. 434/322 |
| 6,112,049 A | | 8/2000 | Sonnenfeld |
| 6,134,552 A | | 10/2000 | Schroeder et al. |
| 6,148,338 A | | 11/2000 | Lachelt et al. |
| 6,149,438 A | | 11/2000 | Richard et al. |

(Continued)

FOREIGN PATENT DOCUMENTS

GB  2 373 625 A  9/2002

(Continued)

OTHER PUBLICATIONS

Jörg Siekmann et al., "Adaptive Course Generation and Presentation," ITS Workshop on Adaptive and Intelligent Web-Based Foundation System, Montreal, The Omega Group; pp. 1-10, 2000.

(Continued)

*Primary Examiner*—Chanda L. Harris
(74) *Attorney, Agent, or Firm*—Fish & Richardson P.C.

(57) ABSTRACT

A course editor includes an input to accept author commands. An interface processes and displays the author commands to facilitate the creation of a course. The interface may include a workspace to display and assemble the structural elements into the course. The workspace may include a menu of structural elements that may be added to the course. The workspace is configured to display a structural element in response to an author command selecting the structural element from the menu. The structural elements may be a sub-course, a learning unit, and/or a knowledge item.

76 Claims, 12 Drawing Sheets

U.S. PATENT DOCUMENTS

| | | | |
|---|---|---|---|
| 6,149,441 A * | 11/2000 | Pellegrino et al. | 434/350 |
| 6,162,060 A * | 12/2000 | Richard et al. | 434/118 |
| 6,164,974 A | 12/2000 | Carlile et al. | |
| 6,175,841 B1 * | 1/2001 | Loiacono | 715/512 |
| 6,315,572 B1 * | 11/2001 | Owens et al. | 434/322 |
| 6,336,813 B1 | 1/2002 | Siefert | |
| 6,347,333 B1 | 2/2002 | Eisendrath et al. | |
| 6,347,943 B1 | 2/2002 | Fields et al. | |
| 6,368,110 B1 | 4/2002 | Koenecke et al. | |
| 6,370,355 B1 | 4/2002 | Ceretta et al. | |
| 6,381,444 B1 | 4/2002 | Aggarwal et al. | |
| 6,397,036 B1 | 5/2002 | Thean et al. | |
| 6,398,556 B1 | 6/2002 | Ho et al. | |
| 6,430,563 B1 | 8/2002 | Fritz et al. | |
| 6,470,171 B1 | 10/2002 | Helmick et al. | |
| 6,471,521 B1 | 10/2002 | Dornbush et al. | |
| 6,514,085 B1 | 2/2003 | Slattery et al. | |
| 6,527,556 B1 | 3/2003 | Koskinen | |
| 6,587,668 B1 | 7/2003 | Miller et al. | |
| 6,606,480 B1 | 8/2003 | Pezzuti et al. | |
| 6,622,003 B1 | 9/2003 | Denious et al. | |
| 6,633,742 B1 | 10/2003 | Turner et al. | |
| 6,643,493 B1 | 11/2003 | Kilgore | |
| RE38,432 E | 2/2004 | Fai et al. | |
| 6,701,125 B1 | 3/2004 | Lohse | |
| 6,709,330 B1 * | 3/2004 | Klein et al. | 463/9 |
| 6,729,885 B1 | 5/2004 | Stuppy et al. | |
| 6,801,751 B1 | 10/2004 | Wood et al. | |
| 2001/0044728 A1 | 11/2001 | Freeman et al. | |
| 2001/0047310 A1 | 11/2001 | Russell | |
| 2002/0006603 A1 | 1/2002 | Peterson et al. | |
| 2002/0042041 A1 | 4/2002 | Owens et al. | |
| 2002/0061506 A1 | 5/2002 | Catten et al. | |
| 2002/0073063 A1 | 6/2002 | Faraj | |
| 2002/0138841 A1 | 9/2002 | Ward | |
| 2002/0142278 A1 | 10/2002 | Whitehurst et al. | |
| 2002/0188583 A1 | 12/2002 | Rukavina et al. | |
| 2003/0013073 A1 | 1/2003 | Duncan et al. | |
| 2003/0049593 A1 | 3/2003 | Parmer et al. | |
| 2003/0073063 A1 | 4/2003 | Dattaray et al. | |
| 2003/0073065 A1 | 4/2003 | Riggs | |
| 2003/0082508 A1 | 5/2003 | Barney | |
| 2003/0113700 A1 | 6/2003 | Simon | |
| 2003/0129576 A1 | 7/2003 | Wood et al. | |
| 2003/0152899 A1 | 8/2003 | Krebs et al. | |
| 2003/0152900 A1 | 8/2003 | Krebs et al. | |
| 2003/0152901 A1 | 8/2003 | Altenhofen et al. | |
| 2003/0152902 A1 | 8/2003 | Altenhofen et al. | |
| 2003/0152903 A1 | 8/2003 | Theilmann | |
| 2003/0152904 A1 | 8/2003 | Doty, Jr. | |
| 2003/0152905 A1 | 8/2003 | Altenhofen et al. | |
| 2003/0152906 A1 | 8/2003 | Krebs et al. | |
| 2003/0157470 A1 | 8/2003 | Altenhofen et al. | |
| 2003/0163784 A1 | 8/2003 | Daniel et al. | |
| 2003/0175664 A1 | 9/2003 | Frangenheim et al. | |
| 2003/0175676 A1 | 9/2003 | Theilmann et al. | |
| 2003/0195946 A1 | 10/2003 | Yang | |
| 2003/0211447 A1 | 11/2003 | Diesel et al. | |
| 2003/0224339 A1 | 12/2003 | Jain et al. | |
| 2004/0081951 A1 | 4/2004 | Vigue et al. | |

FOREIGN PATENT DOCUMENTS

| | | |
|---|---|---|
| WO | WO 99/09490 | 2/1999 |
| WO | WO 02/21379 | 3/2002 |
| WO | WO 02/073442 A | 9/2002 |

OTHER PUBLICATIONS

Lai Jin et al., "An Ontology-Aware Authoring Tool—Functional structure and guidance generation," Proceedings of AIED '99, pp. 85-92, LeManns France, 1999.

Dietrich Albert et al., "Adaptive and Dynamic Hypertext Tutoring Systems Based on Knowledge Space Theory," AIED '97 Artificial Intelligence in Education, Amsterdam vol. 39 of Froulier in Artificial Intelligence and Application, 1997.

Sylvie Ranwez et al., "Description and Construction of Pedagogical Material using an Ontology based DTD," AIED '99 Workshop 2 proceedings "Ontologies for Intelligent Educational Systems", pp. 1-4, 1999.

Michael Jungmann et al., "Adaptive Hypertext in Complex Information Spaces," Daimler-Benz Research & Technology, Technical University of Illmenau, pp. 1-5, Mar. 8, 1997.

Nicola Henze et al., "Modeling Constructivist Teaching Functionality and Structure in the KBS Hyperbook System," University of Hannover, pp. 1-12, Jun. 4, 1999.

Max Mühlhäuser, "Cooperative Computer-Aided Authoring and Learning," University of Karlsruhe, pp. 107-130, 145-161, 165-192, 273-291, 293-318, 1995.

Professor Jouko Paaso, "A New Environment for Courseware Development, Course Delivery and Training," Proceedings of the ED-Media 97, Toronto, 1997.

U.S. Appl. No. 60/201,500, Adams, filed May 3, 2000.

U.S. Appl. No. 60/272,251, Ward, filed Feb. 28, 2001.

U.S. Appl. No. 60/329,088, Riggs, filed Oct. 12, 2001.

U.S. Appl. No. 60/334,714, Diesel, filed Nov. 1, 2001.

U.S. Appl. No. 60/400,606, Diesel, filed Aug. 1, 2002.

Hewlett Packard, "HP OpenView Integration Guide for Developers," Jul. 2002, [Online], [retrieved from the Internet on Mar. 24, 2004: http://h21007.www2.hp.com/dspp/files/unprotected/OpenView/IntegrationGuide/OV_Integration_Guide_7_30.pdf], pp. 67-92, XP002274908.

Hewlett Packard, "hp OpenView Service Navigator for hp OpenView Operations 7.x for UNIX Product Brief," May 2002, [online], [retrieved from the Internet on Mar. 24, 2004: http://www.pervigil.com/PDF/HP/sernav_pb_jun02.pdf], 2 pgs., XP002274906.

Sun Microsystems, "Developing Web Services with SUN™ Open Network Environment," Mar. 2002, [online], [retrieved from the Internet Mar. 24, 2004: http:wwws.sun.com/software/sunone/wp-spine/spine.pdf], pp. 1-32, XP002274909.

Trythall, Steve, "JMS and CORBA Notification Interworking," Dec. 12, 2001, [online], [retrieved from the Internet Mar. 24, 2004: http://www.onjava.com/pub/a/onjava/2001/12/12/jms_not.html], XP002274907.

Lipkin, Daniel, "Universal Learning Format Technical Specification," Jan. 13, 2001, retrieved from the Internet on Jul. 29, 2004, at http://xml.coverpages.org/ulf.html, XP002290517, pp. 1-3.

Eugster, Patrick, et al., "Distributed Asynchronous Collections: Abstractions for Publish/Subscribe Interaction," Agilent Lab. and Lombard Odier Co., Jan. 10, 2000, pp. 1-34, SP002171795.

Shorshita, Teruji et al., "A Large-scale Contents Distribution Architecture Based on Reliable Multicast," Proceedings Internet Workshop, 1999, IWS '99 Osaka, Japan, Feb. 18-20, 1999, pp. 75-80, XP010365597.

* cited by examiner

E-LEARNING COURSE EDITOR

This application is a continuation-in-part of U.S. application Ser. No. 10/134,676, filed Apr. 30, 2002, and titled E-LEARNING SYSTEM, and also claims the benefit of U.S. Provisional Application No. 60/354,945, filed Feb. 11, 2002, and titled FLEXIBLE INSTRUCTIONAL ARCHITECTURE FOR E-LEARNING, both of which are hereby incorporated by reference in their entirety for all purposes.

TECHNICAL FIELD

The following description relates generally to e-learning and in particular to a course editor for e-learning courses.

BACKGROUND

Systems and applications for delivering computer-based training (CBT) have existed for many years. However, CBT systems historically have not gained wide acceptance. A problem hindering the reception of CBTs as a means of training workers and learners is the compatibility between systems. A CBT system works as a stand-alone system that is unable to use content designed for use with other CBT systems.

Early CBTs also were based on hypermedia systems that statically linked content. User guidance was given by annotating the hyperlinks with descriptive information. The trainee could proceed through learning material by traversing the links embedded in the material. The structure associated with the material was very rigid, and the material could not be easily written, edited, or reused to create additional or new learning material.

Newer methods for intelligent tutoring and CBT systems are based on special domain models that must be defined prior to creation of the course or content. Once a course is created, the material may not be easily adapted or changed for different learners' specific training needs or learning styles. As a result, the courses often fail to meet the needs of the trainee and/or trainer.

The special domain models also have many complex rules that must be understood prior to designing a course. As a result, a course is too difficult for most authors to create who have not undergone extensive training in the use of the system. Even authors who receive sufficient training may find the system difficult and frustrating to use. In addition, the resulting courses may be incomprehensible due to incorrect use of the domain model by the authors creating the course. Therefore, for the above and other reasons, new methods and technology are needed to supplement traditional computer based training and instruction.

SUMMARY

According to one general aspect a course editor includes an input to accept author commands. An interface processes and displays the author commands to facilitate the creation of a course. The interface may include a workspace to display and assemble the structural elements into the course.

The workspace may include a menu of structural elements that may be added to the course. The workspace is configured to display a structural element in response to an author command selecting the structural element from the menu. The structural elements may be a sub-course, a learning unit, and/or a knowledge item.

The workspace also may include one or more tabs. Each tab corresponds to a content aggregation level and displays structural elements corresponding to the content aggregation level.

The workspace may be used to create relations between structural elements. The relations are used to indicate a dependency between the structural elements. The workspace includes a menu of relations configured to enable an author to select a relation from the menu and to insert the relation between two structural elements displayed in the workspace. The relation may be inserted by receiving an author command selecting a first structural element and dragging an indication of the relation (e.g., a line or an arrow) from the first structural element to the second structural element.

The relation may be subject taxonomic or non-subject taxonomic. A subject taxonomic relation may be hierarchical, such as a part/whole relation and an abstraction relation. The subject taxonomic relation also may be associative, such as determines, side-by-side, alternative to, opposite to, precedes, context of, process of, values, means of, and affinity. An example of a non-subject taxonomic relation includes a relation that indicates a structural element should be completed before proceeding to a related structural element or a relation that indicates that a structural element belongs to another structural element.

The interface may include a dialog box displaying one or more fields corresponding to a structural element displayed in the workspace. Examples of fields include a name field, a theme field, a content field, a media type field, a learning time field, a thumbnail field, and an attribute field. The dialog box also may include one or more tabs to select different fields. Examples of tabs include a general tab (e.g., with fields to receive information about the content associated with the structural element), an annotation tab (e.g., with a field to receive notes regarding the structural element), a keyword tab (e.g., including a field to receive keywords to help search for a corresponding structural element), and a competency tab (e.g., including fields to receive competencies gained from the content associated with structural element).

The interface may include a course overview to display structural elements and relations of the course. The interface may be configured to receive an author command selecting a structural element from the course overview and to display the selected structural element in the workspace. The dialog box may be configured to automatically correspond to the selected structural element. The interface may be configured to receive an author command selecting a relation from the course overview and to display the selected relation and associated structural elements in the workspace.

The interface also may be configured to receive an author command selecting a learning strategy and to generate a navigation path for display to the author based on the selected learning strategy.

According to another general concept, a graphical user interface for a course editor includes a workspace window to edit and display structural elements of a course, an overview window to display and select a representation of the structural elements of the course, and a dialog box window to display data fields corresponding to structural elements shown in the workspace window.

The graphical user interface may include a menu bar to display course edit menus including functions to control and interact with the course editor. The graphical user interface also may include a button bar including one or more button to invoke course editor function to interact with the windows and their displayed contents.

A structural element may be displayed as a rectangle in the workspace. The rectangle may be color-coded, each type of structural element having a different color.

The graphical user interface may be configured to display a learning strategy window to indicate a selected strategy and to generate a navigation path window to display a suggested sequence of structural elements based on the selected learning strategy.

The graphical user interface also may be configured to automatically size the windows to fit on a corresponding display. The windows may include a vertical scroll bar and/or a horizontal scroll bar to access and display portions of the window that are not displayed.

Other features and advantages will be apparent from the description, the drawings, and the claims.

DESCRIPTION OF DRAWINGS

Like reference symbols in the various drawings indicate like elements.

DETAILED DESCRIPTION

E-learning Content Structure

The e-learning system and methodology structures content so that the content is reusable and flexible. For example, the content structure allows the creator of a course to reuse existing content to create new or additional courses. In addition, the content structure provides flexible content delivery that may be adapted to the learning styles of different learners.

Figure 1:
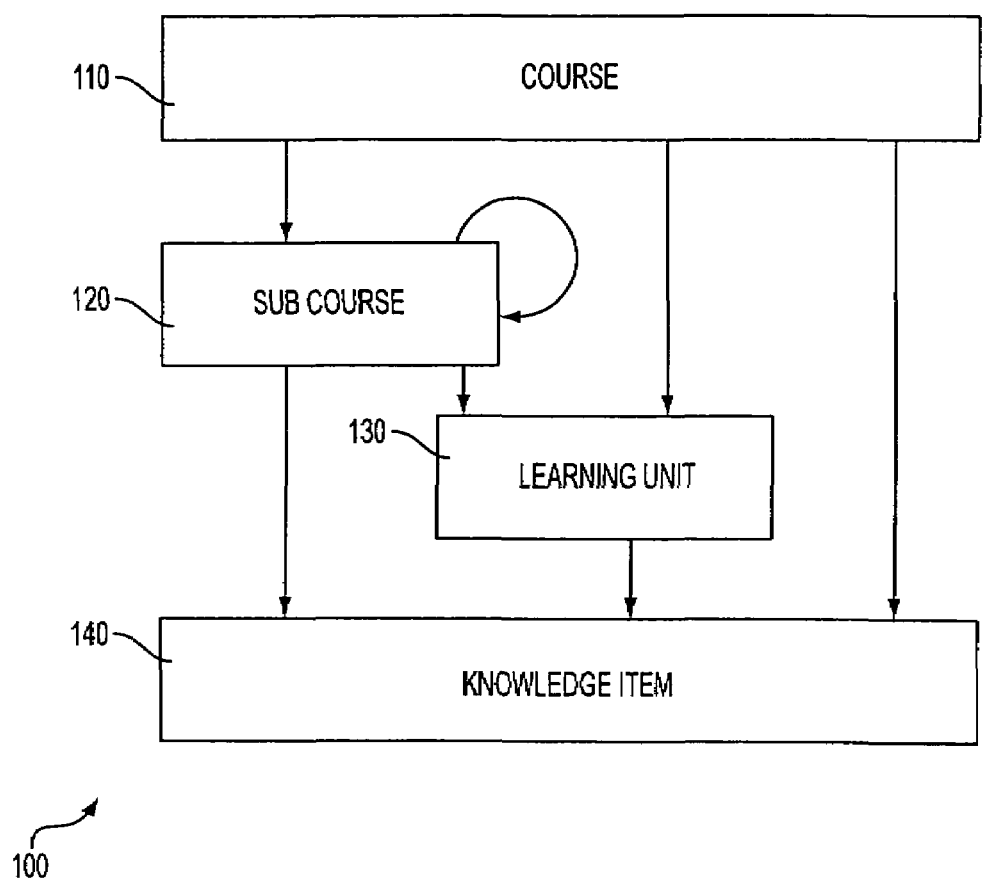
FIG. 1 is an exemplary content aggregation model.

E-learning content may be aggregated using a number of structural elements arranged at different aggregation levels. Each higher level structural element may refer to any instances of all structural elements of a lower level. At its lowest level, a structural element refers to content and may not be further divided. According to one implementation shown in FIG. 1, course material 100 may be divided into four structural elements: a course 110, a sub-course 120, a learning unit 130, and a knowledge item 140.

Starting from the lowest level, knowledge items 140 are the basis for the other structural elements and are the building blocks of the course content structure. Each knowledge item 140 may include content that illustrates, explains, practices, or tests an aspect of a thematic area or topic. Knowledge items 140 typically are small in size (i.e., of short duration, e.g., approximately five minutes or less).

A number of attributes may be used to describe a knowledge item 140, such as, for example, a name, a type of media, and a type of knowledge. The name may be used by a learning system to identify and locate the content associated with a knowledge item 140. The type of media describes the form of the content that is associated with the knowledge item 140. For example, media types include a presentation type, a communication type, and an interactive type. A presentation media type may include a text, a table, an illustration, a graphic, an image, an animation, an audio clip, and a video clip. A communication media type may include a chat session, a group (e.g., a newsgroup, a team, a class, and a group of peers), an email, a short message service (SMS), and an instant message. An interactive media type may include a computer based training, a simulation, and a test.

A knowledge item 140 also may be described by the attribute of knowledge type. For example, knowledge types include knowledge of orientation, knowledge of action, knowledge of explanation, and knowledge of source/reference. Knowledge types may differ in learning goal and content. For example, knowledge of orientation offers a point of reference to the learner, and, therefore, provides general information for a better understanding of the structure of interrelated structural elements. Each of the knowledge types is described in further detail below.

Knowledge items 140 may be generated using a wide range of technologies, however, a browser (including plug-in applications) should be able to interpret and display the appropriate file formats associated with each knowledge item. For example, markup languages (such as a Hypertext Markup language (HTML), a standard generalized markup language (SGML), a dynamic HTML (DHTML®), or an extensible markup language (XML)), JAVASCRIPT®(a client-side scripting language), and/or FLASH® may be used to create knowledge items 140.

HTML may be used to describe the logical elements and presentation of a document, such as, for example, text, headings, paragraphs, lists, tables, or image references.

FLASH® may be used as a file format for FLASH® movies and as a plug-in for playing FLASH® files in a browser. For example, FLASH® movies using vector and bitmap graphics, animations, transparencies, transitions, MP3 audio files, input forms, and interactions may be used. In addition, FLASH® allows a pixel-precise positioning of graphical elements to generate impressive and interactive applications for presentation of course material to a learner.

Learning units 130 may be assembled using one or more knowledge items 140 to represent, for example, a distinct, thematically-coherent unit. Consequently, learning units 130 may be considered containers for knowledge items 140 of the same topic. Learning units 130 also may be considered relatively small in size (i.e., duration) though larger than a knowledge item 140.

Sub-courses 120 may be assembled using other sub-courses 120, learning units 130, and/or knowledge items 140. The sub-course 120 may be used to split up an extensive course into several smaller subordinate courses. Sub-courses 120 may be used to build an arbitrarily deep nested structure by referring to other sub-courses 120.

Courses may be assembled from all of the subordinate structural elements including sub-courses 120, learning units 130, and knowledge items 140. To foster maximum reuse, all structural elements should be self-contained and context free.

Structural elements also may be tagged with metadata that is used to support adaptive delivery, reusability, and search/retrieval of content associated with the structural elements. For example, learning object metadata (LOM) defined by the IEEE "Learning Object Metadata Working Group" may be attached to individual course structure elements. The metadata may be used to indicate learner competencies associated with the structural elements. Other metadata may include a number of knowledge types (e.g., orientation, action, explanation, and resources) that may be used to categorize structural elements.

Figure 2:
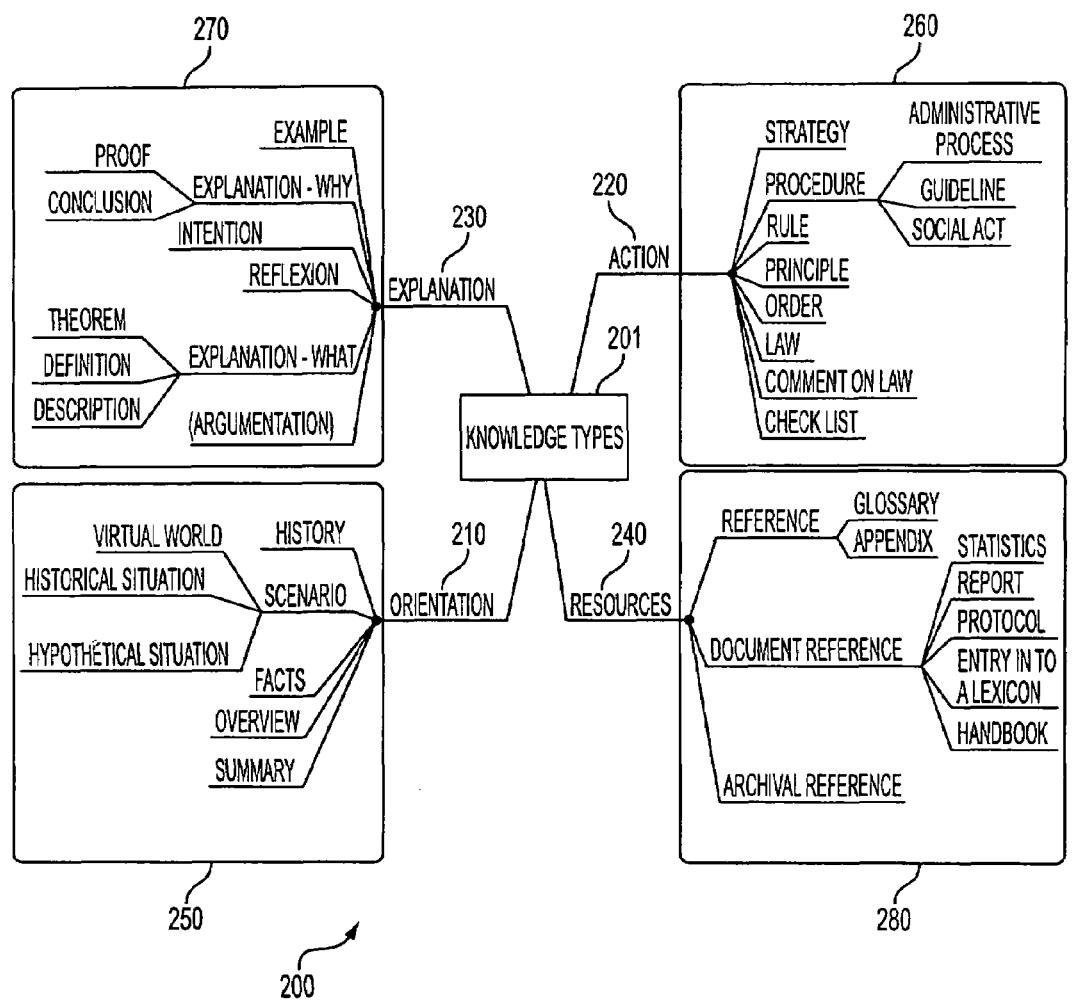
FIG. 2 is an example of an ontology of knowledge types.

As shown in FIG. 2, structural elements may be categorized using a didactical ontology 200 of knowledge types 201 that includes orientation knowledge 210, action knowledge 220, explanation knowledge 230, and reference knowledge 240. Orientation knowledge 210 helps a learner to find their way through a topic without being able to act in a topic-specific manner and may be referred to as "know what." Action knowledge 220 helps a learner to acquire topic related skills and may be referred to as "know how." Explanation knowledge 230 provides a learner with an explanation of why something is the way it is and may be referred to as "know why." Reference knowledge 240 teaches a learner where to find additional information on a specific topic and may be referred to as "know where."

The four knowledge types (orientation, action, explanation, and reference) may be further divided into a fine grained ontology as shown in FIG. 2. For example, orientation knowledge 210 may refer to sub-types 250 that include a history, a scenario, a fact, an overview, and a summary. Action knowledge 220 may refer to sub-types 260 that include a strategy, a procedure, a rule, a principle, an order, a law, a comment on law, and a checklist. Explanation knowledge 230 may refer to sub-types 270 that include an example, a intention, a reflection, an explanation of why or what, and an argumentation. Resource knowledge 240 may refer to sub-types 280 that include a reference, a document reference, and an archival reference.

Dependencies between structural elements may be described by relations when assembling the structural elements at one aggregation level. A relation may be used to describe the natural, subject-taxonomic relation between the structural elements. A relation may be directional or non-directional. A directional relation may be used to indicate that the relation between structural elements is true only in one direction. Directional relations should be followed. Relations may be divided into two categories: subject-taxonomic and non-subject taxonomic.

Subject-taxonomic relations may be further divided into hierarchical relations and associative relations. Hierarchical relations may be used to express a relation between structural elements that have a relation of subordination or superordination. For example, a hierarchical relation between the knowledge items A and B exists if B is part of A. Hierarchical relations may be divided into two categories: the part/whole relation (i.e., "has part") and the abstraction relation (i.e., "generalizes"). For example, the part/whole relation "A has part B," describes that B is part of A. The abstraction relation "A generalizes B" implies that B is a specific type of A (e.g., an aircraft generalizes a jet or a jet is a specific type of aircraft).

Associative relations may be used refer to a kind of relation of relevancy between two structural elements. Associative relations may help a learner obtain a better understanding of facts associated with the structural elements. Associative relations describe a manifold relation between two structural elements and are mainly directional (i.e., the relation between structural elements is true only in one direction). Examples of associative relations include "determines," "side-by-side," "alternative to," "opposite to," "precedes," "context of," "process of," "values," "means of," and "affinity."

The "determines" relation describes a deterministic correlation between A and B (e.g., B causally depends on A). The "side-by-side" relation may be viewed from a spatial, conceptual, theoretical, or ontological perspective (e.g., A side-by-side with B is valid if both knowledge objects are part of a superordinate whole). The side-by-side relation may be subdivided into relations, such as "similar to," "alternative to," and "analogous to." The "opposite to" relation implies that two structural elements are opposite in reference to at least one quality. The "precedes" relation describes a temporal relationship of succession (e.g., A occurs in time before B (and not that A is a prerequisite of B)). The "context of" relation describes the factual and situational relationship on a basis of which one of the related structural elements may be derived. An "affinity" between structural elements suggests that there is a close functional correlation between the structural elements (e.g., there is an affinity between books and the act of reading because reading is the main function of books).

Non Subject-Taxonomic relations may include the relations "prerequisite of" and "belongs to." The "prerequisite of" and the "belongs to" relations do not refer to the subject-taxonomic interrelations of the knowledge to be imparted. Instead, these relations refer to the progression of the course in the learning environment (e.g., as the learner traverses the course). The "prerequisite of" relation is directional whereas the "belongs to" relation is non-directional. Both relations may be used for knowledge items 140 that cannot be further subdivided. For example, if the size of the screen is too small to display the entire content on one page, the page displaying the content may be split into two pages that are connected by the relation "prerequisite of."

Another type of metadata is competencies. Competencies may be assigned to structural elements, such as, for example, a sub-course 120 or a learning unit 130. The competencies may be used to indicate and evaluate the performance of a learner as the learner traverse the course material. A competency may be classified as a cognitive skill, an emotional skill, an senso-motorical skill, or a social skill.

Figure 3:
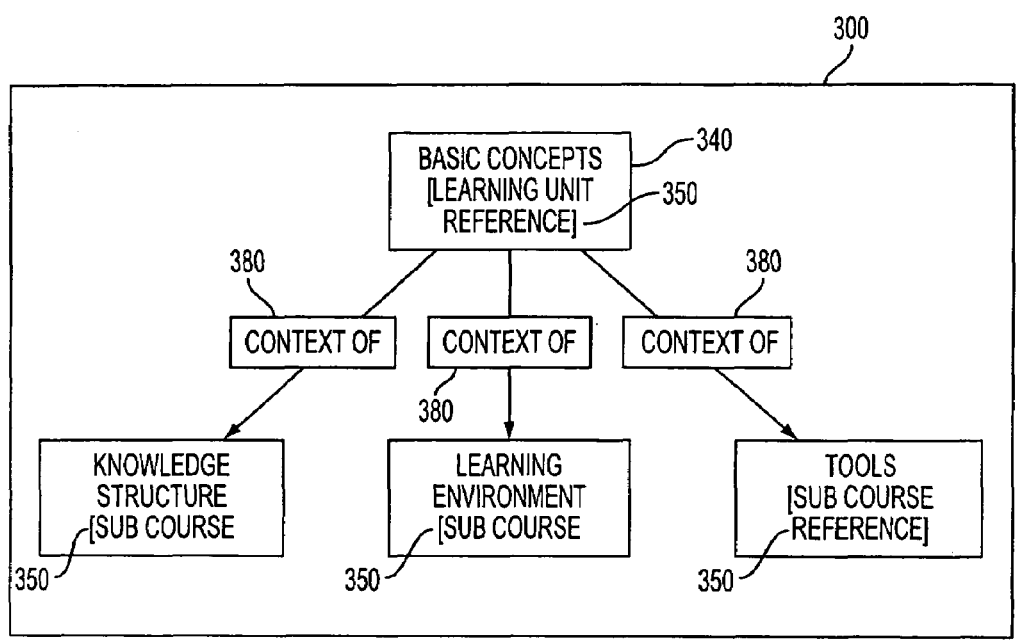
FIG. 3 is an example of a course graph for e-learning.

The content structure associated with a course may be represented as a set of graphs. A structural element may be represented as a node in a graph. Node attributes are used to convey the metadata attached to the corresponding structural element (e.g., a name, a knowledge type, a competency, and/or a media type). A relation between two structural elements may be represented as an edge. For example, FIG. 3 shows a graph 300 for a course. The course is divided into four structural elements or nodes (310, 320, 330, and 340): three sub-courses (e.g., knowledge structure, learning environment, and tools) and one learning unit (e.g., basic concepts). A node attribute 350 of each node is shown in brackets (e.g., the node labeled "Basic concepts" has an attribute that identifies it as a reference to a learning unit). In addition, an edge 380 expressing the relation "context of" has been specified for the learning unit with respect to each of the sub-courses. As a result, the basic concepts explained in the learning unit provide the context for the concepts covered in the three sub-courses.

Figure 4:
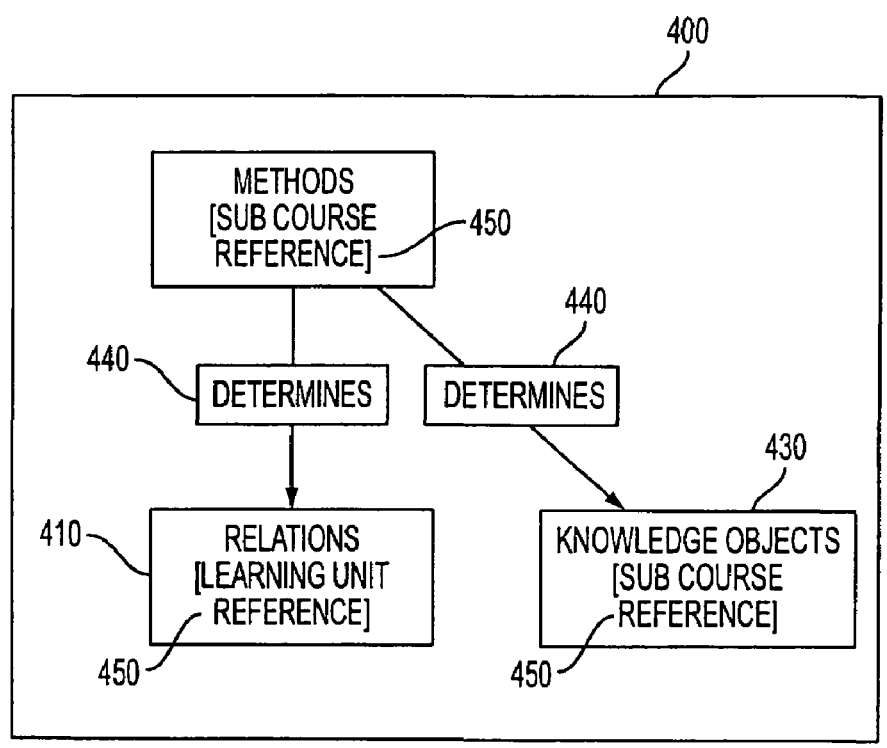
FIG. 4 is an example of a sub-course graph for e-learning.

FIG. 4 shows a graph 400 of the sub-course "Knowledge structure" 350 of FIG. 3. In this example, the sub-course "Knowledge structure" is further divided into three nodes (410, 420, and 430): a learning unit (e.g., on relations) and two sub-courses (e.g., covering the topics of methods and knowledge objects). The edge 440 expressing the relation "determines" has been provided between the structural elements (e.g., the sub-course "Methods" determines the sub-course "Knowledge objects" and the learning unit "Relations".) In addition, the attribute 450 of each node is shown in brackets (e.g., nodes "Methods" and "Knowledge objects" have the attribute identifying them as references to other sub-courses; node "Relations" has the attribute of being a reference to a learning unit).

Figure 5:
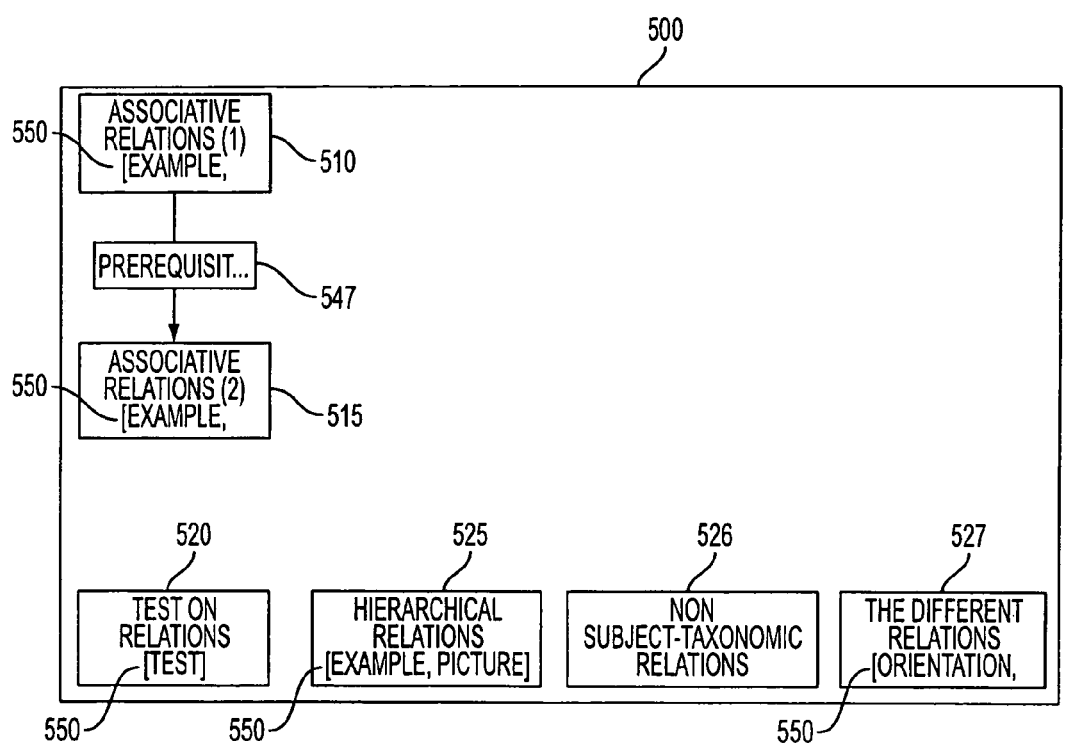
FIG. 5 is an example of a learning unit graph for e-learning.

FIG. 5 shows a graph 500 for the learning unit "Relations" 450 shown in FIG. 4. The learning unit includes six nodes (510, 515, 520, 525, 530, 535, 540, and 545): six knowledge items (i.e., "Associative relations (1)", "Associative relations (2)", "Test on relations", "Hierarchical relations", "Non subject-taxonomic relations", and "The different relations"). An edge 547 expressing the relation "prerequisite" has been provided between the knowledge items "Associative relations (1)" and "Associative relations (2)." In addition, attributes 550 of each node are specified in brackets (e.g., the node "Hierarchical relations" includes the attributes "Example" and "Picture").

E-learning Strategies

The above-described content aggregation and structure associated with a course does not automatically enforce any sequence that a learner may use to traverse the content associated with the course. As a result, different sequencing rules may be applied to the same course structure to provide different paths through the course. The sequencing rules applied to the knowledge structure of a course are learning strategies. The learning strategies may be used to pick specific structural elements to be suggested to the learner as the learner progresses through the course. The learner or supervisor (e.g., a tutor) may select from a number of different learning strategies while taking a course. In turn, the selected learning strategy considers both the requirements of the course structure and the preferences of the learner.

In the classical classroom, a teacher determines the learning strategy that is used to learn course material. For example, in this context the learning progression may start with a course orientation, followed by an explanation (with examples), an action, and practice. Using the e-learning system and methods, a learner may choose between one or more learning strategies to determine which path to take through the course. As a result, the progression of learners through the course may differ.

Learning strategies may be created using macro-strategies and micro-strategies. A learner may select from a number of different learning strategies when taking a course. The learning strategies are selected at run time of the presentation of course content to the learner (and not during the design of the knowledge structure of the course). As result, course authors are relieved from the burden of determining a sequence or an order of presentation of the course material. Instead, course authors may focus on structuring and annotating the course material. In addition, authors are not required to apply complex rules or Boolean expressions to domain models thus minimizing the training necessary to use the system. Furthermore, the course material may be easily adapted and reused to edit and create new courses.

Macro-strategies are used in learning strategies to refer to the coarse-grained structure of a course (i.e., the organization of sub-courses 120 and learning units 130). The macro-strategy determines the sequence that sub-courses 120 and learning units 130 of a course are presented to the learner. Basic macro-strategies include "inductive" and "deductive," which allow the learner to work through the course from the general to the specific or the specific to the general, respectively. Other examples of macro-strategies include "goal-based, top-down," "goal-based, bottom-up," and "table of contents."

Goal-based, top-down follows a deductive approach. The structural hierarchies are traversed from top to bottom. Relations within one structural element are ignored if the relation does not specify a hierarchical dependency. Goal-based bottom-up follows an inductive approach by doing a depth first traversal of the course material. The table of contents simply ignores all relations.

Micro-strategies, implemented by the learning strategies, target the learning progression within a learning unit. The micro-strategies determine the order that knowledge items of a learning unit are presented. Micro-strategies refer to the attributes describing the knowledge items. Examples of micro-strategies include "orientation only", "action oriented", "explanation-oriented", and "table of contents").

The micro-strategy "orientation only" ignores all knowledge items that are not classified as orientation knowledge. The "orientation only" strategy may be best suited to implement an overview of the course. The micro-strategy "action oriented" first picks knowledge items that are classified as action knowledge. All other knowledge items are sorted in their natural order (i.e., as they appear in the knowledge structure of the learning unit). The micro-strategy "explanation oriented" is similar to action oriented and focuses on explanation knowledge. Orientation oriented is similar to action oriented and focuses on orientation knowledge. The micro-strategy "table of contents" operates like the macro-strategy table of contents (but on a learning unit level).

In one implementation, no dependencies between macro-strategies and micro-strategies exist. Therefore, any combination of macro and micro-strategies may be used when taking a course. Application of learning strategies to the knowledge structure of a course is described in further detail below.

E-learning System

Figure 6:
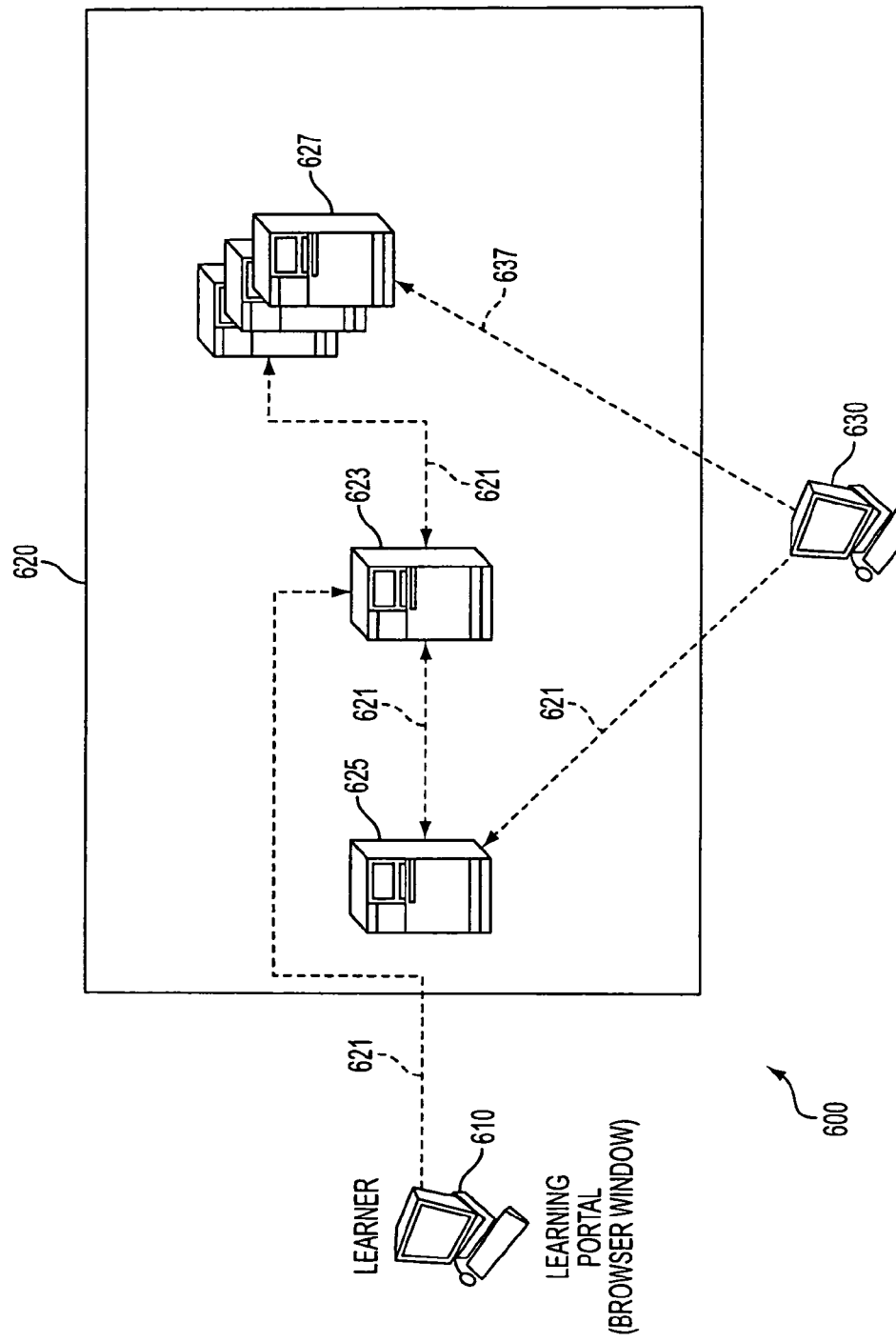
FIGS. 6 and 7 are exemplary block diagrams of e-learning systems.

As shown in FIG. 6 an e-learning architecture 600 may include a learning station 610 and a learning system 620. The learner may access course material using a learning station 610 (e.g., using a learning portal). The learning station 610 may be implemented using a work station, a computer, a portable computing device, or any intelligent device capable of executing instructions and connecting to a network. The learning station 610 may include any number of devices and/or peripherals (e.g., displays, memory/storage devices, input devices, interfaces, printers, communication cards, and speakers) that facilitate access to and use of course material.

The learning station 610 may execute any number of software applications, including an application that is configured to access, interpret, and present courses and related information to a learner. The software may be implemented using a browser, such as, for example, NETSCAPE COMMUNICATOR®, MICROSOFT® INTERNET EXPLORER®, or any other software application that may be used to interpret and process a markup language, such as HTML, SGML, DHTML®, or XML.

The browser also may include software plug-in applications that allow the browser to interpret, process, and present different types of information. The browser may include any number of application tools, such as, for example, JAVA®, ACTIVEX®, JAVASCRIPT®, AND FLASH®.

The browser may be used to implement a learning portal that allows a learner to access the learning system 620. A link 621 between the learning portal and the learning system 620 may be configured to send and receive signals (e.g., electrical, electromagnetic, or optical). In addition, the link may be a wireless link that uses electromagnetic signals (e.g., radio, infrared, to microwave) to convey information between the learning station and the learning system.

The learning system may include one or more servers. As shown in FIG. 6, the learning system 620 includes a learning management system 623, a content management system 625, and an administration management system 627. Each of these systems may be implemented using one or more servers, processors, or intelligent network devices.

Figure 7:
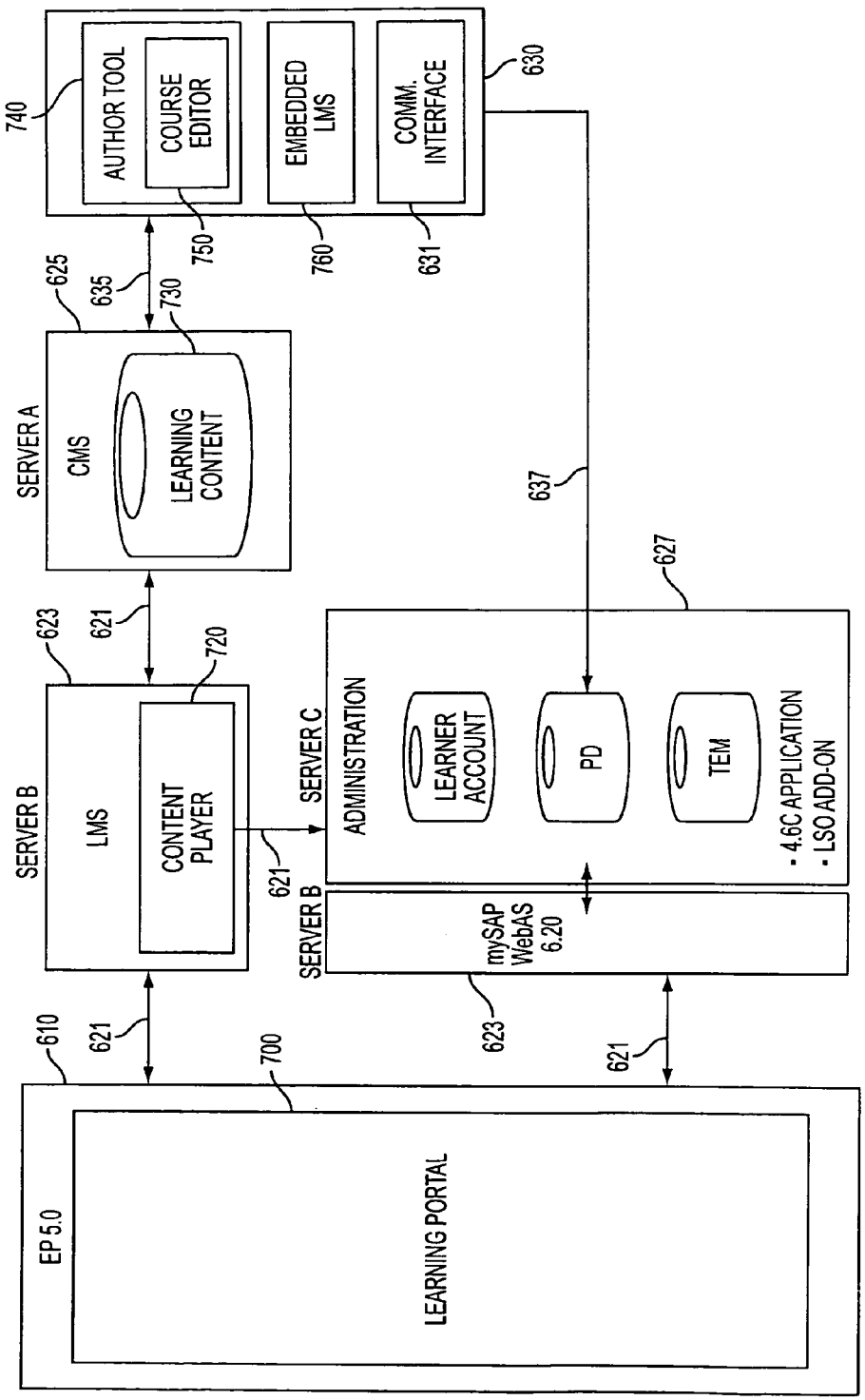

As shown in FIGS. 6 and 7, the administration management system 627 may be implemented using a server, such as, for example, the SAP R/3 4.6C+LSO Add-On. The administration management system 627 may include a database of learner accounts and course information. For example, the learner account may include demographic data about the learner (e.g., a name, an age, a sex, an address, a company, a school, an account number, and a bill) and his/her progress through the course material (e.g., places visited, tests completed, skills gained, knowledge acquired, and competency using the material). The administration management system 627 also may provide additional information about courses, such as course title, description, courses offered, the author/instructor of a course, and the most popular courses.

The content management system 625 may include a learning content server 730. The learning content server 730 may be implemented using a WebDAV® server. The learning content server may include a content repository. The content repository may store course files and media files that are used to present a course to a learner at the learning station 610. The course files may include the structural elements that make up a course and may be stored as XML files. The media files may be used to store the content that is included in the course and assembled for presentation to the learner at the learning station 610.

The learning management system 623 may include a content player 720. The content player 720 may be implemented using a server, such as an SAP® J2EE Engine. The content player 720 is used to obtain course material from the content repository. The content player 720 also applies the learning strategies to the obtained course material to generate a navigation tree or path for the learner. The navigation tree or path is used to suggest a route through the course material for the learner and to generate a presentation of course material to the learner based on the learning strategy selected by the learner. Course navigation is described in further detail below.

The learning management system 623 also may include an interface for exchanging information with the administration management system 627. For example, the content player 720 may update the learner account information as the learner progresses through the course material to indicate, for example, competencies gained, tests passed, courses completed.

Course Author Station

As shown in FIGS. 6 and 7 an e-learning system may also include an author station 630. The author station 630 may be implemented using a workstation, a computer, a portable computing device, or any intelligent device capable of executing instructions and connecting to a network. The author station 630 may include any number of devices and/or peripherals (e.g., displays, memory/storage devices, input devices, interfaces, printers, communication cards, and speakers) that facilitate access to, presentation of, and creation of courses and their associated content.

The author station 630 may execute any number of software applications including an author tool 740 that is configured to create, access, interpret, and present courses (and related course data/information). The author tool 740 may include a course editor 750 and a browser, such as, for example, NETSCAPE COMMUNICATOR®, MICROSOFT® INTERNET EXPLORER®, or any other software application that may be used to interpret and process a markup language, such as HTML, SGML, DHTML®, or XML. The browser also may include software plug-in applications that allow the browser to interpret, process, create, and present different types of information. The browser may include any number of application tools, such as, for example, JAVA®, ACTIVEX®, JAVASCRIPT®, and FLASH®.

The course author tool 740 may access content and associate the content with structural elements. The author tool 740 also may associate knowledge types, relations, and metadata with the structural elements. The author tool 740 may be used to build the structure of a course, i.e., its structural elements and relations. The author tool 740 may save the structural elements and metadata as course files and the associated content as media files.

The author station 630 also may include an embedded learning management system 760. The embedded learning management system 760 is an application program that is similar to the learning management system 623 and enables the author to preview a course by applying learning strategies to the course (e.g., that is being created/modified by the author) in order to view the navigation path that is suggested to a learner based on the applied strategy. Based on the different suggested navigation paths, the author may determine how to create structure for the course and how the created structure is interpreted by the learning management system 623. As a result, the author may edit, modify, or add structure to the course before publishing the course to the learning system 620.

The author station 630 also may include a communications interface 631. After a course is created, the author station 630 may use the communication interface 631 to connect to the learning system 620 to publish the course so that a learner may book and take the course. In particular, the communication interface 631 of the author station 630 may connect to the content management system 625 using a communications link 635. To publish the course on the learning system 620, the author station 630 transfers the course structure and content (e.g., the course files and media files) to the content management system 625. As previously described, the course files may be formatted according to a markup language (e.g., XML). The communications link 635 may be implemented using any permanent or temporary communications link configured to transfer the course files and associated media files (e.g., a communications medium configured to transfer data signals as electrical, electromagnetic, or optical waves). The content management system 625 stores the course files and associated media files in the content repository for access by the content player 720.

The communication interface 631 of the author station 630 also may connect to the administration management system 627 using a communication link 637. The communication link may be implemented by any communication medium that may be configured to send and receive signals (e.g., electrical, electromagnetic, or optical). The author station 630 provides the administration management system 627 with course information (e.g., title, author, description, credits, prerequisites, and competencies gained/required) that is used by a learner, for example, to book a course. Once the course is published, the administration management system 627 makes the course information available to the learning station 610 using the learning portal.

Course Editor

The author tool 740 and author station 630 may include a course editor 750 that can be used in conjunction with a browser to create, modify, build, assemble, and preview course structures and their associated content. The course editor 750 may be used to structure content for use in a course. The course editor 750 includes a course editor interface.

The course editor 750 may be used to create the structure for the course content. The structure may be saved as metadata. The metadata may be interpreted by the content player 720 of the learning management system 623 to present a course to a learner according to a learning strategy selected at run time. In particular, the course editor 750 enables the author to classify and describe structural elements, assign attributes to structural elements, assign relations between structural elements, and build a subject-taxonomic course structure. The course editor 750 primarily generates the structure of the course and not structure of the content (although structure of content may be provided for as well).

Figure 8:
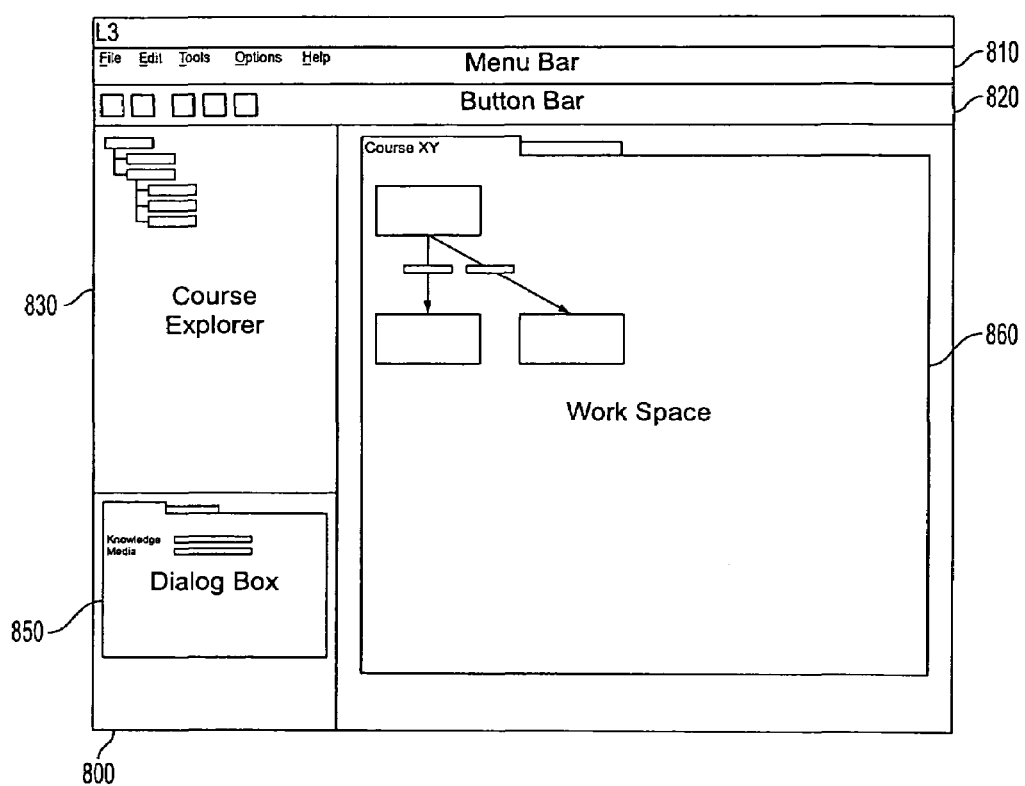
FIG. 8 is an exemplary course editor interface that may be implemented using an authoring tool.

As shown in FIG. 8, the course editor interface 800 may include a menu bar 810, a button bar 820, a course overview 830, a dialog box 850, and work space 860. The menu bar 810 may include various drop-down menus, such as, for example, file, edit, tools, options, and help. The drop-down menus may include functions, such as create a new course, open an existing course, edit a course, or save a course. The button bar 820 may include a number of buttons. The buttons may be shortcuts to functions in the drop down menus that are used frequently and that active tools and functions for use with the course editor 750. The remaining portions of the course editor interface 800 may be divided in to three primary sections or windows: a course overview 830, a dialog box 850, and a workspace 860.

Each of the sections may be provided with horizontal or vertical scroll bars or other means allowing the windows to be sized to fit on different displays while providing access to elements that may not appear in the window.

Figure 9:
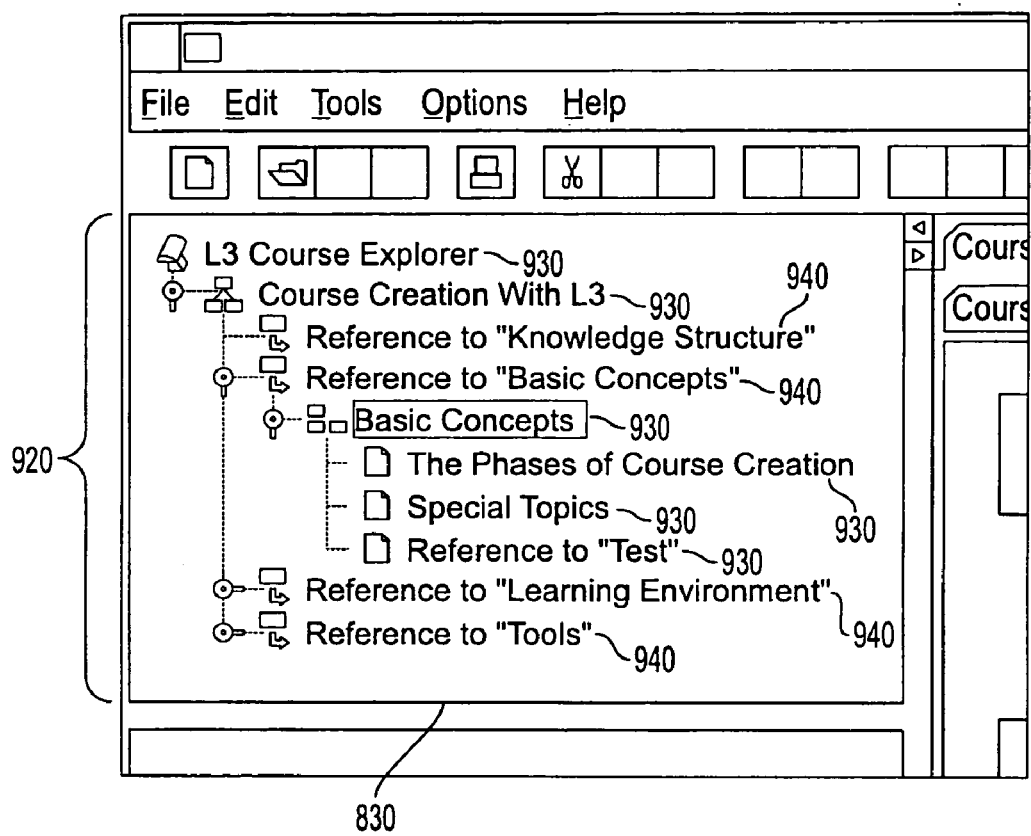
FIG. 9 is an exemplary course overview of the course editor interface.

As shown in FIG. 9, the course overview 830 may be used to select and view components within a course. The author may select various components within the course overview 830 to open and close the components, for example, the structural elements. The components in the course overview 830 may be arranged in an explorer format. The course overview 830 may include a directory 920 of components including files and folders. Files and folders may be expanded to view their contents. However, unlike an explorer, the course overview 830 distinguishes between structural elements 930 and relations 940 (e.g., which may contain learning content). Sub-courses 120, learning units 130, and knowledge items 140, as well as their relations, may be displayed in the course overview 830 using icons. To access a sub-course 120 or learning unit 130 shown in the overview, the author may right click and select open sub-course 120 or learning unit 130. Knowledge items 140 may be opened by double clicking on the associated icon.

Figure 10:
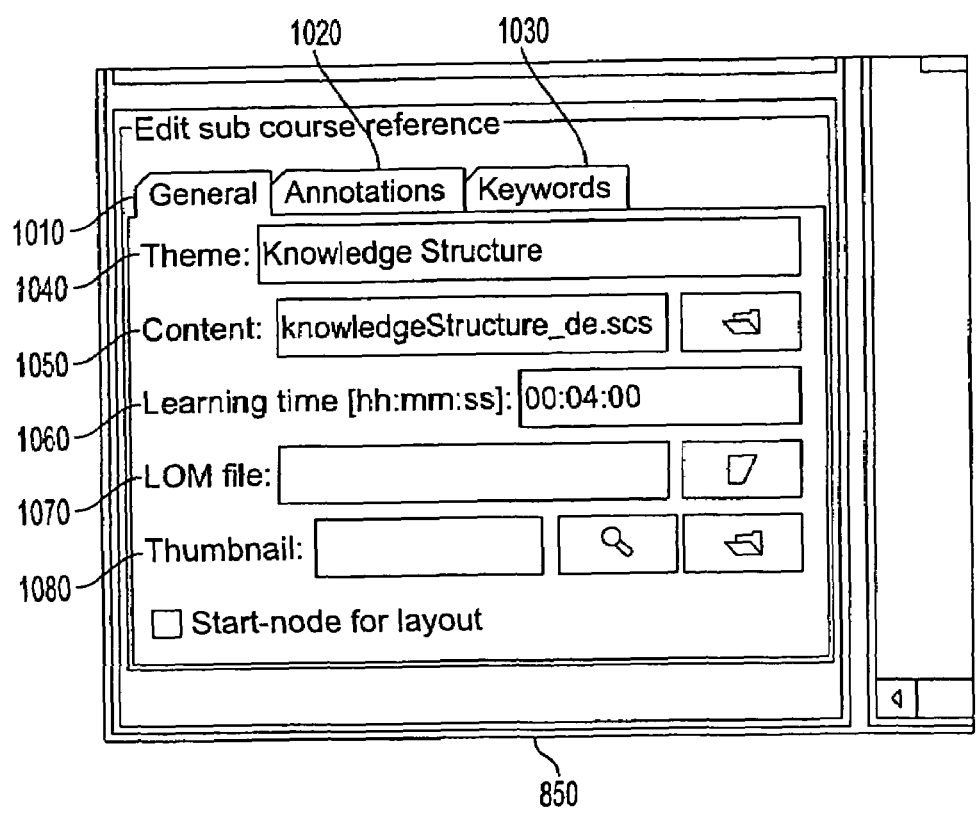
FIG. 10 is an exemplary dialog box of the course editor interface.

As shown in FIG. 10, the dialog box 850 may be used to interact with and edit course components. For example, the dialog box 850 may be arranged with tabs (e.g., general, annotations, keywords, and competency) that may be used to describe the structural elements. Each tab may be used to edit a structural element. The dialog box 850 shown in FIG. 10 includes the tabs general 1010, annotations 1020, and keywords 1030. The dialog box 850 shown in FIG. 10 also includes the fields theme 1040, content 1050, learning time 1060, LOM file 1070, and thumbnail 1080. An author may add content (e.g., an HTML page) and attributes (e.g., a name, a knowledge type, a media type, a LOM, and a competency) to the structural elements using the dialog box 850. The dialog box 850 is automatically configured to correspond to any structural element that has been selected or created in the workspace 860.

The general tab 1010 enables the author to determine general information and/or attributes that are associated with a selected structural element. A name of a structural element may be provided in a name field (not shown). A thumbnail 1080 may be used to give the author an impression of the content associated with the structural element. A theme 1040 may be included to describe a topic, an attribute, or a knowledge type of the structural element. A learning time 1060 may be used to indicate the average amount of time that a learner may need to complete the content associated with the structural element. A LOM file 1060 may be included to add comprehensive metadata to the structural element.

The competency tab (not shown) may be used to classify competencies that are acquired by completing or viewing the structural elements. Examples of competencies include, cognitive, emotional, sensomotoric, and social. Competencies also may be included that are needed or recommended to use the associated structural element.

The annotations tab 1020 may be used to insert comments regarding the content associated with a structural element. For example, notes or a description of the content associated with the structural element may be inserted.

The keyword tab 1030 may be used to enter keywords that are used to search for and/or organize structural elements. Keywords also may be used to classify a structural element.

Figure 11:
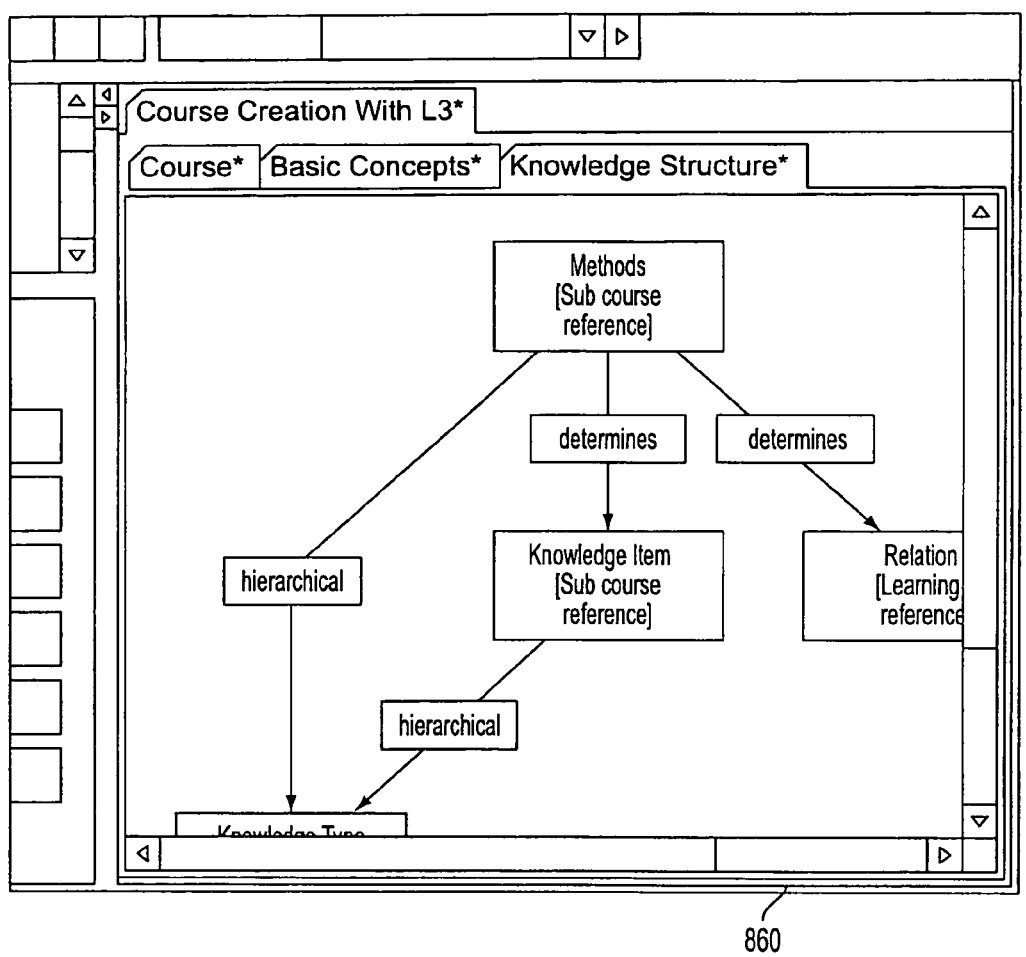
FIG. 11 is an exemplary workspace of the course editor.

As shown in FIG. 11, the workspace 860 may be used to create the structure of a course. The workspace 860 displays structural elements and relations between the structural elements. Structural elements selected in the overview may be displayed in the workspace 860. Similarly, new structural elements and any associated relation may be created in the workspace 860.

Structural elements may be represented in the workspace 860 as rectangles. The rectangles may be color coordinated to indicate the type of structural element (e.g., sub-course 120, learning unit 130, knowledge item 140) and whether the structural element is selected or active. Alternatively, the structural elements may be represented in the workspace by a thumbnail indicative of the content associated with the structural element (e.g., as specified in 1080). Relations may be indicated as lines (i.e., non directional relations) or arrows (i.e. directional relations). The displayed rectangles, lines, and arrows may be labeled with a corresponding name (e.g., assigned using the dialog box 850). The workspace 860 also may include tabs 1110 that correspond to each aggregation level. For example, the structural elements belonging to each aggregation level may be accessed by selecting a corresponding tab.

As shown in FIG. 11, the tab "Course Creation With L3" indicates the course that is currently viewed in the workspace. The tabs "course", "basic concepts", and "knowledge structure" correspond to the aggregation levels within the course. The tab "knowledge structure" is selected and the corresponding structural elements and relations are shown.

The tab may be populated with a name corresponding to a structural element or aggregation level, which may be assigned using the dialog box 850.

Structural elements may be added to a course and structured using the workspace 860. For example, a pop-up menu may be accessed by right clicking on the workspace 860. The pop-up menu includes any available structural elements that may be added to the selected tab. To generate a structural element, the author chooses the appropriate button from the pup-up menu corresponding to the type of structural element to be added.

For example, to generate a sub-course 120, the author selects sub-course 120 from the pop-up menu. Upon selecting the button new sub-course 120, the menu presents a choice of Empty or User. The empty option may be selected to open an empty sub-course 120. The user option may used to open a sub-course 120 with predefined content, such as learning units 130 and/or knowledge items 140. A dialog box 850 corresponding to the sub-course 120 is automatically configured. Using the corresponding dialog box 850 the author may enter a name, attributes, annotations, and keywords for the sub-course 120. The sub-course 120 is added to the course overview 830 and a rectangle with the color-coding corresponding to a sub-course (e.g. green) is added to the workspace 860.

To generate a learning unit 130, the author may choose the appropriate button from the pop-up menu. Upon selecting the button new learning unit 130, the menu presents a choice of Empty or User. The empty option may be selected to open an empty learning unit 130. The user option may used to open a learning unit 130 with predefined content, such as knowledge items 140. A corresponding dialog box 850 prompts the author to enter a name, attributes, annotations, and keywords for the learning unit 130. The learning unit 130 is displayed in the course overview 830 and appears as a rectangle with the corresponding color-coding (e.g. violet) in the workspace 860. To create a knowledge item 140, the author chooses the appropriate button from the pop-up menu. For example, selecting the button create knowledge item 140 automatically configures a dialog box 850 corresponding to the knowledge item 140. The dialog box 850 may be used to enter a name, attributes, annotations, and keywords corresponding to the knowledge item 140. The knowledge item 140 appears in the course overview 830, and the workspace 860 is populated with a rectangle with the corresponding color-coding (e.g. brown). The dialog box 850 also enables the author to assign content to the knowledge item 140. For example, the content field 1050 in the dialog box 850 may be used to establish a reference to a media file corresponding to the knowledge item 140. The media file may be any media that may displayed by a browser. The author also may assign an appropriate knowledge type (e.g., orientation, explanation, action, reference) and media type (e.g., text, images, diagrams, pictures, sounds, films, video, audio, chat groups, email, video conferences, whiteboards, phones, and PDAs) to the knowledge item 140.

The pop-up menu also may be used to create tests and collaborative scenarios. When test is selected from the pop-up menu the dialog box 850 appears. The dialog box 850 includes the tabs general, test parameters, annotations, and keywords. The user may use the general tab to insert a name, content, time, and LOM file. In addition, a rectangle test with the corresponding color-coding appears in the workspace. The test parameters tab may be used to indicate a type of test (e.g., pre-test, exercise, self test, or post test.

A collaboration scenario may be used to provide an opportunity for the learner to interact with other learners.

To create a relation between structural elements, the author selects a structural element in the workspace 860. The author then selects a relation from the pop-up menu. The author may drag a line or arrow corresponding to the relation from the selected structural element to a second structural element. The author also may edit and remove unwanted relations by selecting an existing relation in the workspace and using the pop-up menu to edit or delete the relation.

After completing the course and the associated course structure, the author may activate the embedded learning management system 760 to preview the course. The embedded learning management system 760 applies selected strategies to the course. To preview the course, the author activates the embedded learning management system 760 using the authoring tool. The author then selects a strategy. The embedded learning management system 760 applies the selected strategy to the course structure and determines a navigation path. The navigation path is presented to the author (in a manner that is similar to the display a learner would receive). The author may continue to select other strategies and view the corresponding course navigation path views. Once the author is satisfied with the course structure, the author may transfer the course to the learning system 620 to publish the course.

Course Navigation

The structure of a course is made up of a number of graphs of the structural elements included in the course. A navigation tree may be determined from the graphs by applying a selected learning strategy to the graphs. The navigation tree may be used to navigate a path through the course for the learner. Only parts of the navigation tree are displayed to the learner at the learning portal based on the position of the learner within the course.

As described above, learning strategies are applied to the static course structure including the structural elements (nodes), metadata (attributes), and relations (edges). This data is created when the course structure is determined (e.g., by a course author). Once the course structure is created, the course player processes the course structure using a strategy to present the material to the learner at the learning portal.

To process courses, the content player 720 grants strategies access to the course data and the corresponding attributes. The strategy is used to prepare a record of predicates, functions, operations, and orders that are used to calculate navigation suggestions, which is explained in further detail below.

The content player 720 accesses files (e.g., XML files storing course graphs and associated media content) in the content repository and applies the learning strategies to the files to generate a path through the course. By applying the learning strategies the content player 720 produces a set of course-related graphs (which is simply an ordered list of nodes) that are used to generate a navigation tree of nodes. The set of nodes may be sorted to generate an order list of nodes that may be used to present a path through the material for a learner. A path maybe generated using the embedded learning management system 760 in the same manner. In general graphs and strategies may "interact" in the following ways:

1. A strategy implements a set of Boolean predicates that can be applied to graph nodes. For example: isCompleted (node).

2. A strategy may be informed by an event that some sort of action has been performed on a graph node. For example: navigated(node).

3. A strategy may provide functions that are used to compute new node sets for a given node. For example: NavigationNodes(node).

4. A strategy provides an ordering function that turns node sets computed number 3 into ordered lists.

5. A strategy may decide to alter certain strategy-related node attributes. For example: node.setVisited(true).

Note that the last point is used because a strategy does not keep any internal state. Instead, any strategy-related information is stored in graph nodes' attributes allowing strategies to be changed "on the fly" during graph traversal.

As described there are sets of nodes that may be used to generate a path through a course. One set of nodes is "navigation nodes." Navigation nodes may include all nodes that the strategy identifies that may be immediately reached from the current node. In other words, the navigation nodes represent potential direct successors from a current node. Another set of nodes is "start nodes." Start nodes are potential starting points when entering a new graph. The more starting points this set contains, the more choices a learner has when entering the unit. As a consequence, any strategy should implement at least two functions that can compute these sets and the ordering function that transforms those sets into ordered lists. The functions are described in further detail below using the following examples.

In the following examples, these definitions are used:

C is the set of all courses.

G is a set of graphs.

V is a set of vertices (e.g., knowledge items, references to learning units, references to sub courses, and test) Vertices are used when talking about graphs in a mathematical sense (whereas nodes may used to refer to the resulting course structure)

E is a set of edges (e.g., relations types as used in a mathematical sense).

TG={sc,lu} is the set of graph types such that:
sc=sub-course; and
lu=learning unit.

TC={sc,lu,co,tst} is the set of content types such that:
sc=sub-course;
lu=learning unit;
co=content; and
tst=test.
(With respect to assigning competences to a learner when passing a test, only pretests and posttests are defined as tests; self-tests and exercises are content rather than tests.)

TK={ . . . } is the set of all knowledge types (e.g., as described in the section E-learning content structure).

TR={ . . . } is the set of all relation types(e.g., as described in the section E-learning content structure).

BOOL={true,false} is the Boolean set with the values true and false.

MAC={ . . . } is the set of macro-strategies (e.g., as described in the section E-learning strategies).

MIC={ . . . } is the set of micro-strategies (e.g., as described in the section E-learning strategies).

COMP={ . . . } is the set of all competences.

LCOMP⊆COMP is the set of a learner's competences.

TST={pre,post} is the set of test types, such that:
pre=pretest; and
post=posttest.

A course $c=(G_c,g_s,mac,mic)\epsilon C$ may be defined such that:
$G_c$ is the set of all sub-courses and learning units that are members of c;
$g_s$ is the start graph of course c, in particular $g_s \epsilon G$;
mac∈MAC is the macro-strategy that has been chosen for navigating the course; and
mic∈MIC is the micro-strategy that has been chosen for navigating the course.

Processing of the course begins with the start graph. A graph $g=(V_g,E_g,t_g,comp_g)\epsilon G$ may be defined such that:
$V_g$ is the set of all vertices in g;
$E_g \subseteq V_g \times V_g \times TR$ is the set of all edges in g;
$t_g \epsilon TG$ is the graph type of g; and
$comp_g \subseteq COMP$ Are the competencies of the graph.

In the following description the term content graph is used to identify the sub-graph to which a vertex refers, rather than a graph that includes the vertex. One can think of the vertex representing the "placeholder" of the sub-graph. A vertex $v=(vs_v,tc_v,gc_c,tk_v,tt_v,mscore_v, ascore_v)\epsilon V$ is defined such that:
$vs_v \epsilon BOOL$ is the visited status of v;
$tc_v \epsilon TC$ is the content type of v;
$gc_v \epsilon G$ is the content graph of v;
$tk_v \epsilon TK$ is the knowledge type of v;
$tt_v \epsilon TST$ is the test type of v;
$mscore_v$ is the maximum possible test score of v; and
$ascore_v$ is the test score actually attained for v.

An edge or relation type $e=(v_S,v_E,tr_e)\epsilon E$ may be defined such that:
$v_S \epsilon V$ is the starting vertex of e;
$v_E \epsilon V$ is the end vertex of e; and
$tr_e \epsilon TR$ is the relation type of e.

A predicate is a mapping p:V→BOOL that assigns a value $b_p \epsilon BOOL$ to each vertex v∈V. Therefore:

$$b_p = p(v).$$

An order is a mapping ord:V×V→BOOL that assigns a value $b_{ord} \epsilon BOOL$ to a pair of vertices $v_1,v_2 \epsilon V$. Therefore:

$$b_{ord} = ord(v_1,v_2).$$

The mapping sort:$V^n$,ord→$V^n$ is a sorting function from a set of vertices $V^n$ to a set of vertices $(v_1, \ldots, v_n)=\nabla^n$ with the order ord, provided that:

$(v_1, \ldots, v_n)$=sort($V^n$,ord) such that $$\forall_{i,j \in (1 \ldots n), i \neq j} v_i, v_j \in V^n : ord(v_i, v_j) = \text{true}$$

for i≦j.

The following description explains the use of attributes. Attributes are used to define and implement the learning strategies.

Let $g=(V_g,E_g,t_g,comp_g)\epsilon G$ be a graph with the following attributes:
g.nodes=$V_g$ Are the vertices of g;
g.type=$t_g$ is the type of g; and
g.comp=$comp_g$ is the graph's competencies.

Let $v=(vs_v,tc_v,gc_c,tk_v,tt_v,mscore_v,ascore_v)\in V$ be a vertex with the following attributes:
v.visited=$vs_v$ is the visited status of vertex v (initially this value is false);
v.graph={$g=(V_g,E_g,t_g)\epsilon G | v \epsilon V_g$} is the graph that contains v;

v.contentType=$tc_v$ is the content type of v;

$$v.contentGraph = \begin{cases} g' \in G : tc_v = sc \vee tc_v = lu \\ undef : \text{otherwise} \end{cases}$$

is the content graph of v;
v.knowType=$tk_v$ is the knowledge type of v;

$$v.testType = \begin{cases} tt_v \in TST : tc_v = tst \\ undef : \text{otherwise} \end{cases}$$

is the test type of v;
v.mscore=$mscore_v$ is the maximum possible test score of v (initially this value is 0);
v.ascore=$ascore_v$ is the actual test score attained for v (initially this value is −1
Let e=($v_S, v_E, tr_e$)∈E be an edge with the following attributes:
e.start=$v_S$ is the starting vertex of e;
e.end=$v_E$ is the end point of e;
e.type=$tr_e$ is the relation type of e;
An edge's logical direction does not necessarily have to agree with the direction indicated by the course player, because the course player displays an edge in the "read direction." This applies to the following edge, for example, e=($v_S, v_E$, "is a subset of"). The following explanation refers to the logical direction, in other words, the direction of the edge in the above-described cases is considered to be "rotated." In the following, undirected edges are treated as two edges in opposite directions.

Predicates are "dynamic attributes" of vertices. The strategy computes the dynamic attributes for an individual vertex when necessary.

The following are examples of predicates:
Visited(v): the vertex v has already been visited;
Suggested(v): the vertex v is suggested;
CanNavigate(v): the vertex v can be navigated; and
Done(v): the vertex v is done.

If a vertex is within a learning unit (i.e., v.graph.type=lu), then the micro-strategy is used to compute the predicates. The macro-strategy that is chosen is responsible for determining all other vertices.

Functions are used to compute the navigation sets (vertices that are displayed). A function should return a set of vertices. The strategies implement the functions.

For example, the following functions are:
$\nabla$=StartNodes(g)={v|v is a starting vertex of g} is the set of all starting vertices of graph g. Starting vertices are the vertices of a graph from which navigation within the graph may be initiated in accordance with a chosen strategy.
$\nabla$=NextNodes(v)={v|v is a successor of v} is the set of all successor vertices of vertex v.

For micro-strategies, the chosen macro-strategy calls the functions as needed. When entering a learning unit the macro-strategy selects the appropriate (selected) micro-strategy.

Operations provide information to the chosen strategy about particular events that occur during navigation of a course. The strategy may use them to change the attributes. The operations are:
navigate(v); The runtime environment calls this operation as soon as the vertex v is navigated during the navigation of the course.

testDone(v,MaxScore,ActScore); The runtime environment calls this operation if the vertex v is a test (v.contentType=tst) that has been done. MaxScore contains the maximum possible score, ActScore the score actually attained.

If a vertex is in a learning unit, which means that v.graph.type=lu, then the micro-strategy computes these operations. The macro-strategy is responsible for all other vertices.

The runtime environment uses the sorting function to order the navigation sets that have been computed. The order determines the sequence in which the vertices are to be drawn. The "most important" vertex (e.g., from the strategy's point of view) is placed at the start of the list (as the next vertex suggested). The strategies implement these sorting functions and the runtime environment provides them. The following examples of sorting functions may be defined:
sortNav(V) is used to sort the set of navigation vertices.
The sorting functions are called automatically as soon as the functions have returned sets of vertices to the strategy in question. It is consequently necessary that each macro and micro-strategy have a sorting function at its disposal.

The following description explains the predicates, operations, functions, and sorting functions associated with macro-strategies.

The following is an example of how a top-down (deductive) learning strategy may be realized.

The predicates for the top-down strategy may be defined as follows:
Visited (v):v.visited
The vertex's "visited" attribute is set.
Suggested(v):$\forall(\overline{v},v,tr)\in E$ such that tr=prerequisite we have:
Done($\overline{v}$)=true
All of the vertex's prerequisites are satisfied.
CanNavigate(v):Suggested(v)
Is used in this example like Suggested.
Done(v):
(v.contentType∈{sc,lu}$\wedge$v.contentGraph.comp≠∅
$\subseteq$LCOMP)$\vee$
(v.contentType≠tst $\wedge$v.visited=true $\wedge$($\forall$ $\overline{v}\in$StartNodes(v.contentGraph):Done($\overline{v}$)=true))
$\vee$(c.contentType≠tst $\wedge$(v.ascore*2)$\geq$v.mscore)
The vertex v is considered done if at least one of the following conditions holds:
It includes a learning unit or sub-course that has at its disposal a nonempty set of competences that the learner already possesses;
It does not contain a test, is visited, and all of the content graph's starting vertices have been done; and/or
It deals with a test and at least half of the maximum score has been attained.

The functions for the top-down strategy may be defined as follows:

$$StarNodes(g) =$$

$$\begin{cases} g = undef : \emptyset \\ g.type = lu : c.mic.StartNodes(g) \\ g.type = sc : \{v \in V_g \mid \forall (v^*, v, tr) \in E : tr \neq \text{heirarchical}\} \end{cases}$$

If g is undefined, which means that vertex does not have any content graphs, then the set is empty.

If g is a learning unit, the StartNodes( ) function of the chosen micro-strategy will be used.

If g is a sub-course, all vertices that do not have any hierarchical relations referring to them will be returned.

NextNodes(v)=$\{\overline{v} \in V_{vgraph} | \exists (v, \overline{v}, tr)\} \cup$ StartNodes(v.contentGraph)

All vertices connected to v by an externally directed relation, plus all vertices that are starting vertices of the content graph of v.

The operations for top-down may be defined as follows:

navigate(v):v.visited=true

The vertex's "visited" attribute is set to true.

testDone(v,MaxScore,ActScore):v.mscore=MaxScore, v.ascore=ActScore if $$\begin{cases} Done(v) = \text{true}: LCOMP = LCOMP \cup v.graph.comp, \forall \overline{v} \in v.graph:\overline{v}.visited = \text{true} \\ Done(v) = \text{false}: \forall \overline{v} \in v.graph:\overline{v}.visited = \text{false} \end{cases}$$

The maximum test score and the test score actually attained for the vertex are both set.

If the test is passed, the learner competences will be enlarged to include the competences of the graph, and all of the graph's vertices will be set to "visited."

If the test is not passed, all of the graph's vertices are reset to "not visited."

The sorting function sortNav(V) may be defined upon an order relation $<: V_1 \times V_2 \rightarrow \text{bool}$ on a set of vertices. This requires that the following auxiliary functions be defined:

1. An order relation for vertices with respect to the vertex ID $<_{id}: V \times V \rightarrow \text{bool}$ $v_1 <_{id} v_2 :\Leftrightarrow v_1.id < v_2.id$ 2. A comparison relation for vertices with respect to the vertex ID $=: V \times V \rightarrow \text{bool}$, $v_1 = v_2 :\Leftrightarrow v_1.id = v_2.id$ 3. An order relation on the test types and unit types $<_{test}: (TC \times TST) \times (TC \times TST) \rightarrow \text{bool}$ (tst,pre)<(co,undef)<(lu,undef)<(tst,post)

4. An order relation based on 3. for vertices with respect to the test types and unit types.

$<_{test}: V \times V \rightarrow \text{bool}$ $v_1 <_{test} v_2 :\Leftrightarrow (v_1.\text{contentType}, v_1.\text{testType}) <_{test} (v_2.\text{contentType}, v_2.\text{testType})$ 5. A comparison relation for vertices with respect to the test types and unit types $=_{test}: V \times V \rightarrow \text{bool}$ $v_1 =_{test} v_2 :\Leftrightarrow (v_1.\text{contentType}, v_1.\text{testType}) = (v_2.\text{contentType}, v_2.\text{testType})$ 6. An order relation on the knowledge types based on one of the micro-strategies (see micro-strategies)

$<_{micro}: TK \times TK \rightarrow \text{bool}$

7. An order relation based on 6. on the vertices with respect to the micro-strategies.

$<_{micro}: V \times V \rightarrow \text{bool}$ $v_1 <_{micro} v_2 :\Leftrightarrow v_1.\text{knowType} <_{micro} v_2.\text{knowType}$ 8. A comparison relation to the vertices in regard to the knowledge types $=_{micro}: V \times V \rightarrow \text{bool}$ $v_1 =_{micro} v_2 :\Leftrightarrow v_1.\text{knowType} = v_2.\text{knowType}$ Using these definitions the function $<: V_1 \times V_2 \rightarrow \text{bool}$ may be defined as follows:

$$v_1 < v_2 :\Leftrightarrow \begin{cases} \begin{aligned} &v_1.\text{contentType} \neq tst \land \\ &\exists v \in V_1: [(v_1, v, prereq) \in E_1 \land v.\text{contentType} \neq tst \land v_1 < v \land v \leq v_2] \\ &\lor v_1 <_{test} v_2 \\ &\lor v_1 =_{test} v_2 \land v_1 <_{id} v_2 \end{aligned} & \text{if} \quad g_1 = g_2, t_1 \neq lu \\ \begin{aligned} &v_1.\text{contentType} \neq tst \land \\ &\exists v \in V_1: [(v_1, v, prereq) \in E_1 \land v.\text{contentType} \neq tst \land v_1 < v \land v \leq v_2] \\ &\lor v_1 <_{test} v_2 \\ &\lor v_1 =_{test} v_2 \land v_1 <_{micro} v_2 \\ &\lor v_1 =_{test} v_2 \land v_1 =_{micro} v_2 \land v_1 <_{id} v_2 \end{aligned} & \text{if} \quad g_1 = g_2, t_1 = lu \\ \exists v = (vs, t_1, g_1, tk, tt, ms, as) \in V_2: (v, v_2, tr) \in E_2 \land tr \in \{prereq, hierarchical\} & \text{if} \quad g_1 \neq g_2, t_1 = lu, t_2 \neq lu \\ \text{false} & \text{otherwise} \end{cases}$$

Figure 12:
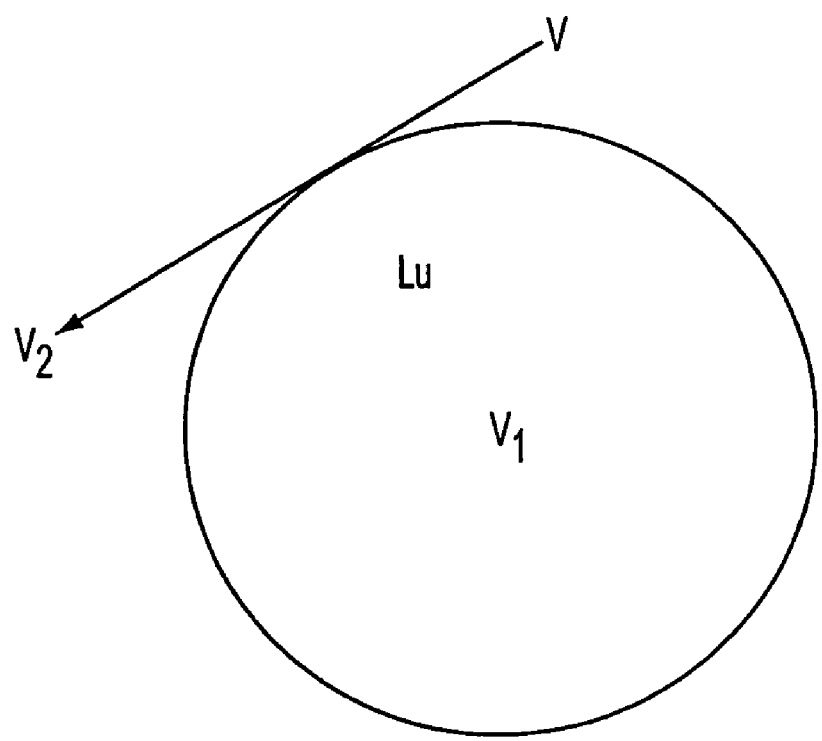
FIG. 12 is an example showing v as the vertex that represents the learning unit LU where $v_1$, $v_2$ are the vertices.

Note, if $g_1 = g_2$, then it is obvious that $V_1 = V_2$, $E_1 = E_2$, $t_1 = t_2$ and $comp_1 = comp_2$. In addition, in case 3, a situation is maintained in which no direct relation between the vertices exists, but there does exist a relation to the higher-order vertex. The order relation will then also apply to all of the vertices in this vertex's content graph. This situation is depicted in FIG. 12, where v is the vertex that represents the learning unit and $v_1, v_2$ are the vertices under consideration.

The function sortNav(V) is the sort of the set V in accordance with the order relation <.

The following process is one method of implementing the function sortNav(V):

1. $V_{preTest}=\{v \in V | v.contentType=tst \land v.testType=pre\}$: the set of all pretests.
2. $V=V-V_{preTest}$: remove all pretests from V.
3. $V_{postTest}=\{v \in V | v.contentType=tst \land v.testType=post\}$: the set of all posttests.
4. $V=V-V_{postTest}$: remove all posttests from V.
5. $V_{preReq}=\{v \in V | \exists (\bar{v},v,tr) \in E: tr=prerequisite\}$: the set of all vertices that have a prerequisite relation directed toward them.
6. $V=V-V_{preReq}$: remove all vertices in $V_{preReq}$ from V.
7. $L=V_{preTest}$: add all pretests into the sorted list.
8. $L=L \cup \{v \in V | v.contentType=co\}, V=V-L$: enlarge the sorted list to include all vertices that have a learning unit and then remove these vertices from V.
9. $L=L \cup \{v \in V | v.contentType=lu\}, V=V-L$: enlarge the sorted list to include all vertices that contain a learning unit and then remove these vertices from V.
10. $L=L \cup V$: enlarge the sorted list to include the remaining vertices from V.
11. Search for all vertices in $v \in V_{preReq}$:
    the vertex $v \in L$ such that
    $(v^*,v,prerequisite) \in E \land dist(v^*)=MAX$ (the vertex that is located farthest back in L and that possesses a prerequisite relation to $v$).
    Add $v$ into L behind $v^*$.
12. $L=L \cup V_{postTest}$: enlarge the sorted list to include all posttests.
13. Return the sorted list L as the result.

The subsets determined in steps 7–12 are themselves sorted by the order relation $<_{id}$.

The following is an example of how a bottom-up (Inductive) learning strategy may be implemented.

The predicates for this strategy may be the same as those used for the macro-strategy, top-down. The functions for bottom-up may be defined as follows:

$$StartNodes(g) = \begin{cases} g = undef: \varnothing \\ g.type = lu: c.mic.StartNodes(g) \\ g.type = sc: \{v \in V_g | \forall (v^*, v, tr) \in E: tr \neq hierarchical\} \end{cases}$$

If g is undefined, the vertex doesn't have a content graph and the set is empty.

If g is a learning unit, then the StartNodes( ) function of the chosen micro-strategy will be used.

If g is a sub-course, then all vertices that do not have any hierarchical relations referring to them will be returned.

$$NextNodes(v) = \{\bar{v} \in V_{vgraph} | \exists (\bar{v}, v, tr)\} \cup$$

$$\begin{cases} v.contentType = le \land \exists (v, v^*, tr) \in E: tr = hierarchic \land Done(v^*) = false: \\ OrientationOnly.StartNodes(v.contentGraph) \\ else: \\ StartNodes(v.contentGraph) \end{cases}$$

All vertices that are connected to $v$ by an externally directed relation.

If the vertex contains a learning unit and one of the hierarchically subordinate vertices has not yet been visited, enlarge the set to include the learning unit's starting vertex using the micro-strategy "orientation only." Otherwise, enlarge the set to include all vertices that are starting vertices of the content graph of v.

The operations and sorting function for the bottom-up strategy are the similar to the macro-strategy top-down and therefore are not repeated.

Linear macro-strategies represent a special case of the macro-strategies that have already been described. In linear macro-strategies, the elements of the sorted sets of vertices are offered for navigation sequentially, rather than simultaneously. This linearization may be applied to any combination of macro and micro-strategies.

The following description includes examples of how a micro-strategy may be realized. In this example, an orientation only micro-strategy is described.

The predicates for the micro-strategies may be defined as follows:

Visited (v):v.visited

The vertex's "visited" attribute is set.

Suggested(v):$\forall(\bar{v},v,tr) \in E$ such that tr=prerequisite we have:

Done($\bar{v}$)=true

All of the vertex's prerequisites are already satisfied.

CanNavigate(v):Suggested(v)

This may be used like Suggested.

Done(v):

(v.contentType$\neq$tst $\land$ v.visited=true)$\lor$ (c.contentType=tst $\land$ (v.ascore*2)$\geq$v.mscore)

The vertex v is considered done if:
    It does not contain a test and has already been visited.
    It deals with a test and at least half of the maximum score has been attained.

The functions may be defined as follows:
StartNodes(g)
    =$\{v \in V_g | v.knowType=Orientation\} \cup \{v \in V_g | \exists (v, \bar{v},tr) \in E: tr=prereq \land \bar{v}.knowType=Orientation\}$ The set of all vertices with knowledge type orientation, plus all vertices that have a prerequisite relation to a vertex with knowledge type orientation.

NextNodes(v)=$\varnothing$

For this micro-strategy, this is always the empty set. In other words, no successor vertices exist because all relevant vertices are contained in the set of starting vertices.

The operations may be defined as follows:
navigate(v):v.visited=true
The vertex's "visited" attribute is set to true.
testDone(v,MaxScore,ActScore):v.mscore=MaxScore, v.ascore=ActScore
if $$\begin{cases} Done(v) = \text{true}: LCOMP = LCOMP \cup v.graph.comp, \forall \bar{v} \in v.graph:\bar{v}.visited = \text{true} \\ Done(v) = \text{false}: \forall \bar{v} \in v.graph:\bar{v}.visited = \text{false} \end{cases}$$

The maximum test score and the test score actually attained for the vertex are both set.

If the test is passed, the learner competences will be enlarged to include the competences of the graph, and all of the graph's vertices will be set to "visited."

If the test is not passed, all of the graph's vertices are reset to "not visited."

The micro-strategy orientation only may use a sorting function that is similar to sorting function for the macro-strategy top-down and, therefore is not repeated.

The following is an example of the implementation of an example oriented micro-strategy. The predicates for this strategy are identical to those for the micro-strategy orientation only and are not repeated.

The functions may be defined as follows:

StartNodes(g)=$V_g$

All vertices that are contained in the learning unit.

NextNodes(v)=∅

For this micro-strategy, this is always the empty set.

In other words, no successor vertices exist because all relevant vertices are contained in the set of starting vertices.

The operations for the example-oriented micro-strategy are identical to those for the micro-strategy "orientation only," and, therefore, are not repeated.

The sorting function for example-oriented is defined as follows:

$$v_1 < v_2 :\Leftrightarrow \begin{cases} v_1 <_{test} v_2 \vee \\ v_1 =_{test} v_2 \wedge v_1 <_{id} v_2 & \text{if} & v_2.contentType = tst \\ \exists (v_1, v_2, tr) \in E : tr = prereq \vee \\ (v_1.knowType = Example \wedge v_1 <_{id} v_2) & \text{if} & v_2.knowType = Example \\ v_1.knowType = Example \vee \\ v_1 <_{id} v_2 & & \text{otherwise} \end{cases}$$

Steps for executing sortNav(V):

1. $V_{examp}$={v∈V|v.knowType=Example}∪{v∈V|∃(v, v̄,tr)∈E:tr=prereq∧v̄.knowType=Example}: the set of all vertices that contain examples, plus the prerequisites of these vertices.
2. $V_{remain}$=V−$V_{examp}$: the remaining vertices from V.
3. $L_{examp}$=TopDown.sortNav($V_{examp}$): sort the set of examples using the sorting algorithm from the top-down strategy.
4. $L_{remain}$=TopDown.sortNav($V_{remain}$): sort the set of remaining vertices using the sorting algorithm from the top-down strategy.
5. L=$L_{examp}$∪$L_{remain}$: form the union of the two sorted lists.
6. Return the sorted list L as the result.

The predicates, functions, and operations for the micro-strategy explanation-oriented are identical to those for the micro-strategy example-oriented, and, therefore are not repeated. The sorting function for the explanation-oriented micro-strategy is similar to the sorting function of the micro-strategy example-oriented (the only difference being that explanations, rather than examples, are used to form the two sets).

The predicates, functions, and operations for the micro-strategy action-oriented are identical to those for the micro-strategy example-oriented, and, therefore are not repeated. The sorting function for the action-oriented micro-strategy is similar to the sorting function of the micro-strategy example-oriented (the only difference being that actions, rather than examples, are used to form the two sets).

A number of implementations have been described. Nevertheless, it will be understood that various modifications may be made. For example, advantageous results may be achieved if the steps of the disclosed techniques are performed in a different order and/or if components in a disclosed system, architecture, device, or circuit are combined in a different manner and/or replaced or supplemented by other components. Accordingly, other implementations are within the scope of the following claims.

What is claimed is:

1. One or more machine-readable media that store executable instructions which, when executed, generate a course editor for an electronic course, the course editor comprising:
   an input to accept author commands; and
   an interface to edit the electronic course in response to the author commands, the interface comprising:
      a workspace to display structural elements that comprise the electronic course, the workspace displaying the structural elements graphically as the structural elements relate to one another in the electronic course, the workspace providing functionality that allows an author to edit, interactively on the workspace, content of the structural elements and relationships among the structural elements, the relationships among the structural elements defining a flow through the electronic course;
      wherein display of the structural elements is dictated by a learning strategy that is applied to the structural elements to affect the flow through the electronic course, the structural elements storing attributes relating to the learning strategy, and the learning strategy altering at least one of the attributes when the learning strategy is applied to the structural elements.

2. The machine-readable media of claim 1, wherein the workspace comprises a menu of structural elements that may be added to the electronic course.

3. The machine-readable media of claim 2, wherein the workspace displays a new structural element in response to an author command selecting the new structural element from the menu.

4. The machine-readable media of claim 1, wherein the structural elements comprise at least one of a sub-course, a learning unit, and a knowledge item.

5. The machine-readable media of claim 1, wherein the workspace comprises one or more tabs, each tab corresponding to a content aggregation level to display structural elements corresponding to the content aggregation level.

6. The machine-readable media of claim 1, wherein the workspace provides a relation between at least two structural elements that is used to indicate a dependency between the at least two structural elements.

7. The machine-readable media of claim 6, wherein the relation is true in one direction only.

8. The machine-readable media of claim 6, wherein the relation is true in two directions.

9. The machine-readable media of claim 6, wherein the relation comprises a subject taxonomic relation.

10. The machine-readable media of claim 9, wherein the subject taxonomic relation comprises a hierarchical relation.

11. The machine-readable media of claim 10, wherein the hierarchical relation comprises one of a part/whole relation and an abstraction relation.

12. The machine-readable media of claim 9, wherein the subject taxonomic relation comprises an associative relation.

13. The machine-readable media of claim 12, wherein the associative relation comprises one of determines, side-by-side, alternative to, opposite to, precedes, context of, process of, values, means of, and affinity.

14. The machine-readable media of claim 6, wherein the relation comprises a non-subject taxonomic relation.

15. The machine-readable media of claim 14, wherein the non-subject taxonomic relation comprises a relation that indicates that a target structural element should be completed before proceeding to a related structural element.

16. The machine-readable media of claim 14, wherein the non-subject taxonomic relation comprises a relation that indicates that a target structural element belongs to another structural element.

17. The machine-readable media of claim 1, wherein the workspace comprises a menu of relations that enable an author to select a relation from the menu and to insert the relation between a first structural element and a second structural element displayed in the workspace.

18. The machine-readable media of claim 17, wherein the interface inserts the relation into displayed structural elements in response to receiving author commands selecting the first structural element and dragging the relation from the first structural element to the second structural element.

19. The machine-readable media of claim 1, wherein the interface comprises a dialog box displaying one or more fields corresponding to a structural element displayed in the workspace.

20. The machine-readable media of claim 19, wherein the one or more fields comprise a name field.

21. The machine-readable media of claim 19, wherein the one or more fields comprise a theme field.

22. The machine-readable media of claim 19, wherein the one or more fields comprise a content field to assign content to a structural element displayed in the workspace.

23. The machine-readable media of claim 19, wherein the one or more fields comprise a media type field.

24. The machine-readable media of claim 19, wherein the one or more fields comprise a learning time field.

25. The machine-readable media of claim 19, wherein the one or more fields comprise a thumbnail field.

26. The machine-readable media of claim 19, wherein the one or more fields comprise an attribute field to assign a knowledge type to a structural element displayed in the workspace.

27. The machine-readable media of claim 19, wherein the dialog box comprises one or more tabs to select different fields.

28. The machine-readable media of claim 27, wherein the one or more tabs comprise a general tab having fields to receive information about content associated with structural elements.

29. The machine-readable media of claim 27, wherein the one or more tabs comprise an annotation tab having a field to receive notes regarding content associated with the structural elements.

30. The machine-readable media of claim 27, wherein the one or more tabs comprise a keyword tab having a field to receive a keyword for use in searching for a structural element that corresponds to the keyword.

31. The machine-readable media of claim 27, wherein the one or more tabs comprise a competency tab having fields to receive competencies gained from content associated with a structural element.

32. The machine-readable media of claim 1, wherein the interface comprises a course overview to display constituent structural elements of the electronic course and relations among the constituent structural elements in the electronic course.

33. The machine-readable media of claim 32, wherein the interface receives an author command selecting a constituent structural element from the course overview and displays a selected constituent structural element in the workspace.

34. The machine-readable media of claim 33, wherein the interface automatically displays a dialog box corresponding to the selected constituent structural element.

35. The machine-readable media of claim 32, wherein the interface receives an author command selecting a relation from the course overview and displays a selected relation and associated structural elements in the workspace.

36. One or more machine-readable media that store executable instructions which, when executed, generate a graphical user interface of a course editor for an electronic course, the graphical user interface comprising:

a workspace window to edit and to display structural elements of the electronic course, the workspace window displaying the structural elements graphically as the structural elements relate to one another in the electronic course, the workspace window providing functionality that allows an author to edit, interactively on the workspace window, content of the structural elements and relationships among the structural elements, the relationships among the structural elements defining a flow through the electronic course, wherein display of the structural elements in the workspace window is dictated by a learning strategy that is applied to the structural elements to affect the flow through the electronic course, the structural elements storing attributes relating to the learning strategy, and the learning strategy altering at least one of the attributes when the learning strategy is applied to the structural elements;

an explorer window to display the structural elements as icons in explorer format; and a dialog box window to display data fields corresponding to structural elements displayed in the workspace window.

37. The machine-readable media of claim 36, further comprising a menu bar to display course editor menus comprised of functions to control, and to interact with, the course editor.

38. The machine-readable media of claim 36, further comprising a button bar comprising one or more buttons to invoke course editor functions to interact with the workspace, explorer and dialog box windows and contents of the workspace, explorer and dialog box windows.

39. The machine-readable media of claim 36, wherein a structural element is displayed as a rectangle in the workspace window.

40. The machine-readable media of claim 36, wherein the rectangle is color-coded, each type of structural element having a different color.

41. The machine-readable media of claim 36, wherein the workspace window comprises a workspace menu of structural elements that may be added to the electronic course.

42. The machine-readable media of claim 41, wherein the workspace window displays a structural element selected from the workspace menu.

43. The machine-readable media of claim 36, wherein the structural elements comprise at least one of a sub-course, a learning unit, and a knowledge item.

44. The machine-readable media of claim 36, wherein the workspace window comprises one or more tabs, each tab corresponding to a content aggregation level to display structural elements corresponding to the content aggregation level.

45. The machine-readable media of claim 36, wherein the workspace window displays a relation between two structural elements that indicates a dependency between the two structural elements.

46. The machine-readable media of claim 45, wherein the dependency between the two structural elements is indicated by an arrow, the arrow indicating that the dependency applies in one direction only.

47. The machine-readable media of claim 45, wherein the dependency between the two structural elements is indicated by a line, the line indicating that the dependency applies in two directions.

48. The machine-readable media of claim 45, wherein the dialog box specifies that the relation is subject taxonomic.

49. The machine-readable media of claim 48, wherein the dialog box specifies that the relation is hierarchical.

50. The machine-readable media of claim 49, wherein the dialog box specifies that the relation is one of a part/whole relation and an abstraction relation.

51. The machine-readable media of claim 48, wherein the dialog box specifies that the relation is one of determines, side-by-side, alternative to, opposite to, precedes, context of, process of, values, means of, and affinity.

52. The machine-readable media of claim 45, wherein the dialog box specifies that the relation comprises a non-subject taxonomic relation.

53. The machine-readable media of claim 52, wherein the dialog box specifies that the non-subject taxonomic relation comprises a relation that indicates a target structural element should be completed before proceeding to a related structural element.

54. The machine-readable media of claim 52, wherein the dialog box specifies that the non-subject taxonomic relation comprises a relation that indicates that a target structural element belongs to another structural element.

55. The machine-readable media of claim 36, wherein the workspace window comprises a menu of relations and the workspace window displays a relation selected from the menu.

56. The machine-readable media of claim 55, wherein the relation selected from the menu is inserted between structural elements displayed in the workspace window by indicating a first structural element in the workspace window, displaying an indication of the relation extending from the first structural element, and connecting the relation to a second structural element displayed in the workspace window.

57. The machine-readable media of claim 36, wherein the dialog box displays one or more fields corresponding to a structural element displayed in the workspace window.

58. The machine-readable media of claim 57, wherein the one or more fields receive data characterizing a structural element.

59. The machine-readable media of claim 57, wherein the one or more fields comprise a name field.

60. The machine-readable media of claim 57, wherein the one or more fields comprise a theme field.

61. The machine-readable media of claim 57, wherein the one or more fields comprise a content field to assign content to a structural element.

62. The machine-readable media of claim 57, wherein the one or more fields comprise a media type field.

63. The machine-readable media of claim 57, wherein the one or more fields comprise a learning time field.

64. The machine-readable media of claim 57, wherein the one or more fields comprise a thumbnail field.

65. The machine-readable media of claim 57, wherein the one or more fields comprise an attribute field to assign a knowledge type to a structural element displayed in the workspace window.

66. The machine-readable media of claim 57, wherein the dialog box comprises one or more tabs each populated with one or more fields.

67. The machine-readable media of claim 66, wherein the one or more tabs comprise a general tab including fields to receive information about content associated with the structural elements.

68. The machine-readable media of claim 66, wherein the one or more tabs comprise an annotation tab that comprises a field to receive notes regarding content associated with the structural elements.

69. The machine-readable media of claim 66, wherein the one or more tabs comprise a keyword tab including a field to receive a keyword for use in searching for a structural element that corresponds to the keyword.

70. The machine-readable media of claim 66, wherein the one or more tabs comprise a competency tab comprising a field to receive competencies gained from the content associated with the structural elements.

71. The machine-readable media of claim 36, wherein the explorer window displays an indication of a selected structural element and the workspace window displays the selected structural element.

72. The machine-readable media of claim 71, wherein the dialog box window automatically adjusts display in accordance with the selected structural element.

73. The machine-readable media of claim 36, wherein the graphical user interface displays a learning strategy window to specify the learning strategy and to generate a navigation path window to display a suggested sequence of structural elements based on the learning strategy.

74. The machine-readable media of claim 36, wherein the workspace, explorer and dialog box windows are automatically sized to fit on a corresponding display.

75. The machine-readable media of claim 74, wherein one or more of the workspace, explorer and dialog box windows comprises a vertical scroll bar to access and to display window portions.

76. The machine-readable media of claim 74, wherein one or more of the workspace, explorer and dialog box windows comprises a horizontal scroll bar to access and to display window portions.

* * * * *